（12）United States Patent
Hakkaku

(10) Patent No.: US 10,065,376 B2
(45) Date of Patent: Sep. 4, 2018

(54) THREE-DIMENSIONAL OBJECT FABRICATION DEVICE, THREE-DIMENSIONAL OBJECT FABRICATION METHOD, AND THREE-DIMENSIONAL OBJECT

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/312,665

(22) PCT Filed: May 21, 2015

(86) PCT No.: PCT/JP2015/064566
§ 371 (c)(1),
(2) Date: Nov. 21, 2016

(87) PCT Pub. No.: WO2015/178443
PCT Pub. Date: Nov. 26, 2015

(65) Prior Publication Data
US 2017/0136706 A1    May 18, 2017

(30) Foreign Application Priority Data
May 22, 2014    (JP) ................. 2014-106501

(51) Int. Cl.
*B32B 3/00*    (2006.01)
*B29C 67/00*    (2017.01)
*B33Y 30/00*    (2015.01)
*B33Y 10/00*    (2015.01)
*B33Y 80/00*    (2015.01)
*B29K 105/00*    (2006.01)

(52) U.S. Cl.
CPC ...... *B29C 67/0088* (2013.01); *B29C 67/0059* (2013.01); *B33Y 10/00* (2014.12); *B33Y 30/00* (2014.12); *B33Y 80/00* (2014.12); *B29K 2105/0002* (2013.01); *B29K 2995/002* (2013.01); *B29K 2995/0026* (2013.01)

(58) Field of Classification Search
CPC ......... B33Y 10/00; B33Y 30/00; B33Y 50/00; B33Y 80/00
See application file for complete search history.

(56) References Cited

U.S. PATENT DOCUMENTS

2015/0197063 A1*    7/2015 Shinar .................... G06F 17/50
700/98

FOREIGN PATENT DOCUMENTS

JP    2001018297    1/2001

OTHER PUBLICATIONS

"International Search Report (Form PCT/ISA/210) of PCT/JP2015/064566", dated Jun. 30, 2015, with English translation thereof, pp. 1-4.

* cited by examiner

*Primary Examiner* — Elizabeth Evans Mulvaney
(74) *Attorney, Agent, or Firm* — JCIPRNET

(57) ABSTRACT

A three-dimensional object fabrication device, a three-dimensional object fabrication method, and a three-dimensional object decorated in any desired colors are provided. In the three-dimensional object, second colored regions of the layers overlap each other, and a discharged ink volume of a coloring ink per unit volume is reduced to a smaller volume in the second colored region than in a first colored region adjacent to the second colored region.

14 Claims, 10 Drawing Sheets

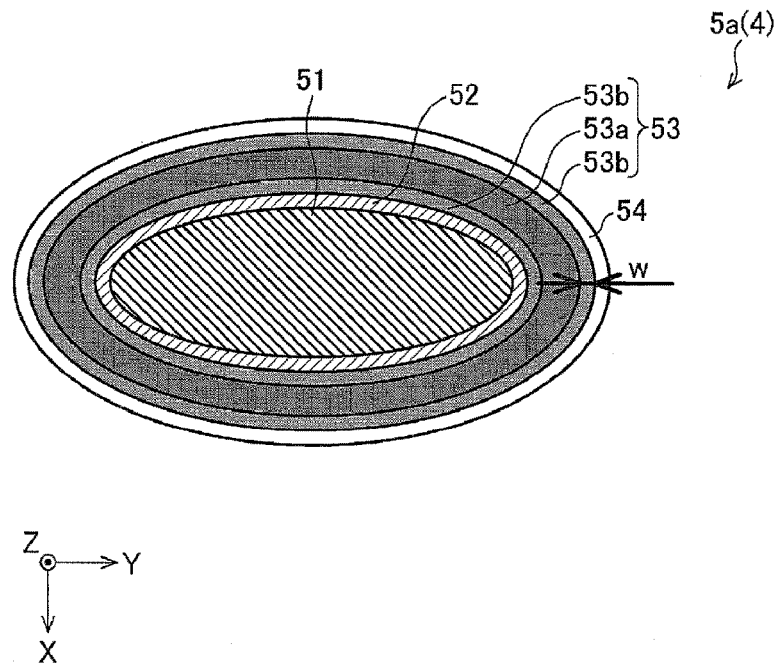
FIG. 2
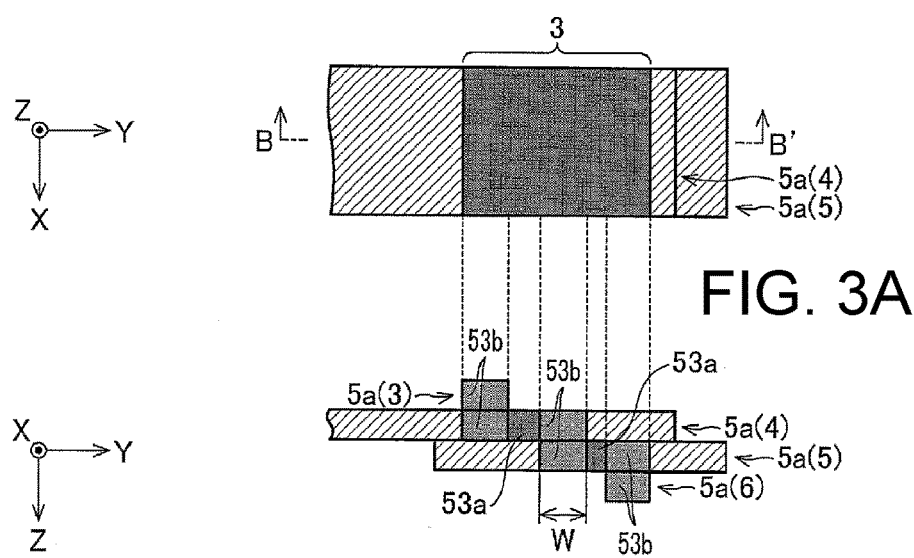
FIG. 3A
FIG. 3B

THREE-DIMENSIONAL OBJECT FABRICATION DEVICE, THREE-DIMENSIONAL OBJECT FABRICATION METHOD, AND THREE-DIMENSIONAL OBJECT

CROSS-REFERENCE TO RELATED APPLICATION

This application is a 371 of international application of PCT application serial no. PCT/JP2015/064566, filed on May 21, 2015, which claims the priority benefit of Japan application no. JP 2014-106501, filed on May 22, 2014. The entirety of the abovementioned patent applications is hereby incorporated by reference herein and made a part of this specification.

TECHNICAL FIELD

The present invention relates to a device for and a method of fabricating a three-dimensional object, and a three-dimensional object thereby fabricated. The present invention more particularly relates to a device for and a method of fabricating a three-dimensional object by depositing inks in layers to form a laminate of multiple layers, and a three-dimensional object thus fabricated.

BACKGROUND ART

Known methods of fabricating three-dimensional objects may include the inkjet printing described in Patent Literature 1, fused deposition modeling (FDM), sheet lamination, inkjet binder, stereo lithography (SL), and selective laser sintering (SLS).

Among the conventional methods is most typically used an inkjet printing method of forming a laminate of patterns by ejecting ultraviolet-curable resins using a 3D printer. This inkjet printing method of fabricating a three-dimensional object includes the steps of transforming the design and mechanism of interior and exterior shapes of a final product into a data format using a three-dimensional CAD, slicing the obtained data to create pattern data of multilayered sliced pieces of data by computer, and ejecting the ultraviolet-curable resins from a head according to the pattern data to form a laminate of layers.

Conventionally, three-dimensional objects fabricated by this technique may be decorated (with patterns and/or in colors).

CITATION LIST

Patent Literature

Patent Literature 1: Japanese Unexamined Patent Publication No. 2001-18297 (published on Jan. 23, 2001)

SUMMARY

Technical Problems

In connection with the known inkjet printing technique applicable to three-dimensional structures, the inventor of this application fabricated three-dimensional objects decorated in colors by the lamination technique using inkjet-discharged inks; a molding ink, and decorative inks (for example, yellow, magenta, cyan, and black coloring inks).

Then, the inventor was faced with unfavorable outcomes of the color decoration in some objects.

Specifically, with any overlap between color-decorated parts of two adjacent layers in a layer-stacking direction, the overlapping parts may be visually recognized as a darker color tone than desired. On the contrary, any space between the color-decorated parts of the upper and lower layers may be visually recognized as color loss at the border between color-decorated parts. As a result, when a miniature diorama of landscape is fabricated, such color loss may appear as contour-like lines, thus degrading the fabricated product in appearance. Such an overlap or color loss, even in a small width of a few microns, may be visually recognized. In the 3D printers, three-dimensional scans are partly mechanically performed. This feature, combined with the trajectory accuracy of inkjet droplets, makes it difficult to suppress the variation of position accuracy to less than a few microns.

To address these issues, the present invention is directed to providing a device for and a method of fabricating a three-dimensional object favorably decorated in colors, and a three-dimensional object thus fabricated.

Technical Solutions

To solve the above problems, a three-dimensional object fabrication device of the present invention includes a formation unit that forms layers in a stacked configuration using one of a coloring ink and a transparent ink. The formation unit forms an overlap region of the layers using a same one of the inks in a manner that a discharged ink volume of the same one of the inks per unit volume is reduced to a smaller volume in the overlap region than in any non-overlap region of the layers made of the same one of the inks but the overlap region.

In an attempt to form the colored layers using, for example, the coloring ink in a manner that colored parts in the respective layers are continuous in the layer-stacking direction with no overlap therebetween, high-accuracy adjustments are required of positions of the colored parts to be formed in the respective layers. This may be a bottleneck in speedy fabrication of the three-dimensional object. This device forms the parts made of the same ink so as to overlap each other. This may afford an accelerated process of fabricating the three-dimensional object.

The overlap between the parts made of the same ink may avoid the risk of color loss.

Further, according to the above configuration of the present invention, the discharged ink volume of the coloring ink per unit volume is reduced to a smaller volume in the overlap region than in the non-overlap region. For example, the discharged ink volume may be regulated so that the overlap region exhibits a desired color tone only after the overlap is produced. This aspect may speedily provide the three-dimensional object with a pleasant color tone by preventing such an event that the color tone is undesirably darkened by the overlap.

According to one aspect of the three-dimensional object fabrication device of the present invention, in addition to the above configuration, the overlap region is where colored parts made of an ink containing the coloring ink overlap each other, and the formation unit forms, as the colored parts in a respective one of the layers, the overlap region and an adjacent region adjacent to the overlap region in a direction perpendicular to the layer-stacking direction, and the formation unit forms the overlap region in a manner that a discharged ink volume of the coloring ink per unit volume is reduced to a smaller volume in the overlap region than in the adjacent region.

According to the above configuration, to fabricate the three-dimensional object by the lamination technique, this device forms the colored parts in the respective layers so as to overlap each other. In an attempt to form the colored layers in a manner that the colored parts in the respective layers are continuous in the layer-stacking direction with no overlap therebetween, high-accuracy adjustments are required of positions of the colored parts to be formed in the respective layers (the positions need to be adjusted with great caution). This may be a bottleneck in speedy fabrication of the three-dimensional object. In this aspect, the colored parts in the respective layers are made to partly overlap each other. This may afford an accelerated process of fabricating the three-dimensional object.

Thus having the colored parts in the respective layers partly overlap each other may prevent that the colored parts in upper and lower layers are spaced apart, giving the impression of color loss.

Further, the discharged ink volume of the coloring ink per unit volume is reduced to a smaller volume in the overlap region than in the adjacent region. For example, the discharged ink volume may be regulated so that the overlap region exhibits a desired color tone only after the overlap is produced. This aspect may speedily provide the three-dimensional object with a pleasant color tone by preventing such an event that the color tone is undesirably darkened by the overlap.

According to one aspect of the three-dimensional object fabrication device of the present invention, in addition to the above configuration, the formation unit forms the overlap region by discharging the coloring ink and the transparent ink.

According to one aspect of the three-dimensional object fabrication device of the present invention, in addition to the above configuration, the formation unit forms the overlap region in a manner that the discharged ink volume in total of the coloring ink per unit volume of the overlap region in upper and lower ones of the layers equals to the discharged ink volume of the coloring ink per unit volume of the adjacent region in one of the layers.

According to the above configuration, the overlap region may have a desired color tone (color tone of the adjacent region in the same layer) only after the overlap is produced. This aspect may speedily provide the three-dimensional object with a pleasant color tone by preventing such an event that the color tone is undesirably darkened by the overlap.

According to one aspect of the three-dimensional object fabrication device of the present invention, in addition to the above configuration, the formation unit forms a first overlap region and a second overlap region in a respective one of the layers, and the formation unit, of two of the layers stacked on each other, makes the first overlap region in a lower one of the layers overlap with the second overlap region in an upper one of the layers or overlap with the first overlap region in the upper one of the layers.

According to the above configuration, the colored layer formed by the continuous colored parts may be inclined in the layer-stacking direction.

According to one aspect of the three-dimensional object fabrication device of the present invention, in addition to the above configuration, the formation unit forms, in a respective one of the layers, the first overlap region and the second overlap region in an equal width along an inward direction of the layer, and the colored part in one of the layers has a width greater than or equal to 2w, where w is the width of the first and second overlap regions.

According to one aspect of the three-dimensional object fabrication device of the present invention, in addition to the above configuration, the three-dimensional object fabrication device further has a second formation unit. The second formation unit forms the overlap region of the layers made of the same one of the inks in a whole region of the layers. The second formation unit forms the overlap region in a manner that the discharged ink volume of the same one of the inks per unit volume in the whole region equals to the discharged ink volume of the same one of the inks per unit volume in the overlap region formed by the second formation unit.

According to the above configuration, the second formation unit adjusts the discharged ink volume, so that the whole region and the overlap region exhibit the same color tone. The whole region, therefore, exhibits a desired color tone only after the overlap is produced. This may prevent that the color tone is undesirably darkened by the overlap.

Producing the overlap between the layers may afford an accelerated process of fabricating the three-dimensional object.

According to one aspect of the three-dimensional object fabrication device of the present invention, in addition to the above configuration, the second formation unit sets a width of the whole region along the inward direction of the layers to a width twice as large as a thickness (d) of the layers in the layer-stacking direction (2D).

The discharged ink volume in the whole region per unit volume is equal to the discharged ink volume in the overlap region (second colored region 53b) formed by the formation unit. According to this aspect, such a whole region, when viewed along the inward direction, may be prevented from degrading in color tone. The discharged ink volume in the whole region per unit volume is reduced to a smaller volume than in the non-overlap region. The whole region, however, is formed in a relatively large thickness along the inward direction. Therefore, the color tone of the whole region is not undesirably weakened.

According to one aspect of the three-dimensional object fabrication device of the present invention, in addition to the above configuration, the three-dimensional object fabrication device further has a third formation unit. The third formation unit forms a transparent part using the transparent ink in at least two of the layers on an inner side thereof than the colored parts. The third formation unit makes the transparent parts included in upper and lower ones of the at least two of the layers partly overlap with each other.

According to one aspect of the three-dimensional object fabrication device of the present invention, in addition to the above configuration, the three-dimensional object fabrication device further has a fourth formation unit. The fourth formation unit forms a light-reflective part using one of a white ink and a light-reflective ink in at least two of the layers having the transparent parts, the light-reflective parts being formed on an inner side of the layers than the transparent parts. The fourth formation unit makes the light-reflective parts in upper and lower ones of the at least two of the layers partly overlap each other.

According to the above configuration, when coloring inks in process colors; Y (yellow), M (magenta), C (cyan), and K (black) are used on the outer side of the white ink, a full-color image may be obtained by subtractive color mixture.

To solve the above problems, the present invention further provides a method of fabricating a three-dimensional object, including a formation step of forming layers having colored parts made of an ink including a coloring ink in a stacked configuration so as to have the colored parts partly overlap each other as an overlap region. In the formation step, the overlap region and an adjacent region adjacent to the overlap region in a direction perpendicular to a layer-stacking direction are formed as the colored part in a respective one of the layers, and the overlap region is formed in a manner that a discharged ink volume of the coloring ink per unit volume is reduced to a smaller volume in the overlap region than in the adjacent region.

This method overlaps the parts made of the same ink. In an attempt to form the colored layers using, for example, the coloring ink in a manner that the colored parts in the respective layers are continuous in the layer-stacking direction with no overlap therebetween, high-accuracy adjustments are required of positions of the colored parts to be formed in the respective layers. This may be a bottleneck in speedy fabrication of the three-dimensional object. According to this method, the layers are formed with an overlap therebetween. This may afford an accelerated process of fabricating the three-dimensional object.

The overlap between the parts made of the same ink may avoid the risk of color loss.

Further, according to the above configuration, the discharged ink volume of the coloring ink per unit volume is reduced to a smaller volume in the overlap region than in the non-overlap region. For example, the discharged ink volume may be regulated so that the overlap region exhibits a desired color tone only after the overlap is produced. This aspect may speedily provide the three-dimensional object with a pleasant color tone by preventing such an event that the color tone is undesirably darkened by the overlap.

To solve the above problem, the three-dimensional object of the present invention includes layers made of one of a coloring ink and a transparent ink and formed in a stacked configuration. A discharged ink volume of one of the coloring ink and the transparent ink per unit volume is reduced to a smaller volume in an overlap region of the layers made of a same one of the inks than in any non-overlap region of the layers made of the same one of the inks but the overlap region.

The three-dimensional object thus obtained may exhibit a pleasant color tone.

Effect of the Invention

The present invention provides a three-dimensional object that exhibits a pleasant color tone.

BRIEF DESCRIPTION OF THE DRAWINGS

FIG. 2 is a plan view of a layer formed by a device for and a method of fabricating a three-dimensional object according to an embodiment of the present invention.

FIGS. 3A and 3B are partial views of a multilayered three-dimensional object obtained by the three-dimensional object fabrication device and the three-dimensional object fabrication method according to one embodiment of the present invention; FIG. 3A is an upper perspective view, and FIG. 3B is a cross-sectional view.

DESCRIPTION OF EMBODIMENTS

Embodiment 1

An embodiment of the present invention is hereinafter described.

[1] Three-Dimensional Object

[1-1] Overall Structure

Figure 1A:
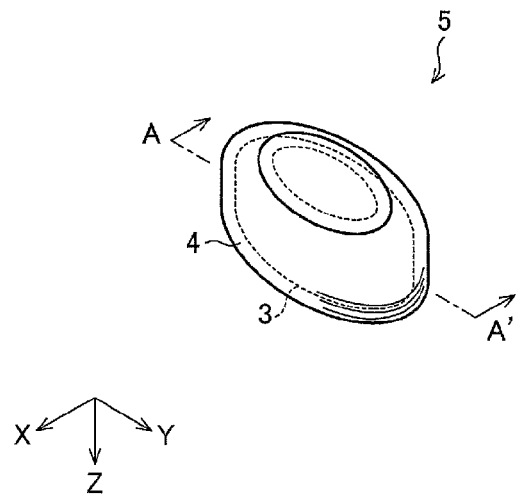
FIG. 1A is an external view of a three-dimensional object according to an embodiment of the present invention.
Figure 1B:
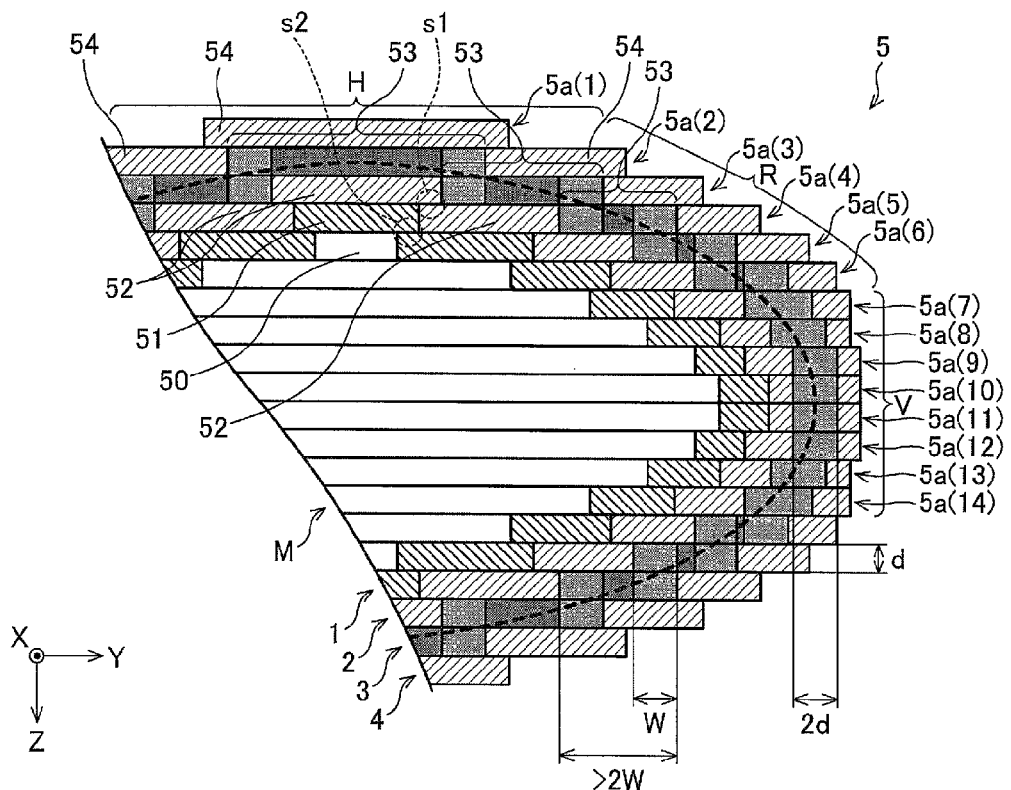
FIG. 1B is a cross-sectional view taken along A-A' line of FIG. 1A.

FIG. 1A is an external view of a three-dimensional object according to an embodiment of the present invention. FIG. 1B is a cross-sectional view taken along A-A' line of FIG. 1A.

A three-dimensional object 5 has flat upper, lower, and side surfaces and further has curved surfaces from its side surface to the upper and lower surfaces. This object has a substantially cylindrical shape. The shape of the three-dimensional object 5 illustrated in FIG. 1 is a non-limiting example of the present invention. This object may have a shape selected from any shapes including hexahedron, sphere, ring, and horseshoe, and may have a hollow structure.

The three-dimensional object 5 has a three-dimensional structure including the following layers in the mentioned order from its outer-surface side (outer side) toward inner side (toward its center); a second transparent layer 4, a colored layer 3 made of an ink containing a coloring material (coloring ink), a first transparent layer 2 made of a transparent ink (FIG. 1B), a light-reflective layer 1 made of a white ink or a light-reflective ink (FIG. 1B), and a molded layer M constituting the body of this object. The three-dimensional object 5 has a structure in which the molded layer M at the center is coated with the light-reflective layer 1, first transparent layer 2, colored layer 3, and second transparent layer 4 in the mentioned order. Stated differently, the three-dimensional object 5 is a three-dimensional object decorated in colors (structure including the colored layer 3 as its outermost layer, first transparent layer 2, light-reflective layer 1, and molded layer M) and covered with a transparent layer (second transparent layer 4).

This embodiment defines the molded layer M alone as the body of the molded object. Optionally, the molded layer M and the light-reflective layer 1 may constitute the body, or the object may not necessarily have the molded layer M, in which case the light-reflective layer 1 alone constitutes the body. The body may have a hollow inside.

All of the light-reflective layer 1, first transparent layer 2, colored layer 3, second transparent layer 4, and molded layer M are formed by depositing inks by the inkjet printing.

Exemplified inks may include ultraviolet curing-type inks. The ultraviolet curing-type ink quickly curable may facilitate the formation of multiple layers on one another, allowing the three-dimensional object to be fabricated in a shorter period of time. The ultraviolet curing-type ink contains an ultraviolet-curable compound. The ultraviolet-curable compound may be selected from any compounds curable by being irradiated with ultraviolet light. Specific examples of the ultraviolet-curable compound may include curable monomers and curable oligomers polymerized by being irradiated with ultraviolet light. Examples of the curable monomers may include low-viscosity acrylic monomers, vinyl ethers, oxetane-based monomers, and cycloaliphatic epoxy monomers. Examples of the curable oligomers may include acrylic oligomers. Examples of the coloring material contained in the coloring ink may include inorganic and organic pigments and dyes. The transparent ink contains none of such coloring materials.

The ultraviolet curing-type ink is a non-limiting example of the present invention. Other examples may include thermoplastic inks. When one selected from the thermoplastic inks is used, the discharged heated ink is cured by cooling. To quickly cure the ink used then, a cooling means may be forcibly employed.

The cross-sectional surface of the three-dimensional object 5 illustrated in FIG. 1B is obtained when the three-dimensional object 5 of FIG. 1A is taken along a Y-Z plane at its center in an XYZ coordinate system illustrated in FIG. 1A.

As illustrated in FIG. 1B, the three-dimensional object 5 is a three-dimensional object having a plurality of layers 5a(1), 5a(2), 5a(3), 5a(4), 5a(5), . . . stacked on one another by the inkjet printing and lamination technique. This diagram illustrates the coordinate system in which Z axis extends along a layer-stacking direction. The layers 5a(1), 5a(2), 5a(3), 5a(4), 5a(5), . . . are extending along an X-Y plane of this coordinate system. The total number of layers to be formed is not particularly limited.

In the three-dimensional object 5, as described earlier, the molded layer M at the center is coated with, from its center toward outer-surface side, the light-reflective layer 1, first transparent layer 2, colored layer 3, and second transparent layer 4 in the mentioned order. The layers 5a(1), 5a(2), 5a(3), 5a(4), 5a(5), . . . are layers of the three-dimensional object 5 sliced in a direction along the Z axis as illustrated in FIG. 1B. The layers 5a(1), 5a(2), 5a(3), 5a(4), 5a(5), . . . respectively include a part of the molded layer M (hereinafter, part 50 of the molded layer), a part of the light-reflective layer 1 (hereinafter, part 51 of the light-reflective layer), a part of the first transparent layer 2 (hereinafter, part 52 of the first transparent layer), a part of the colored layer 3 (hereinafter, part 53 of the colored layer), and a part of the second transparent layer 4 (hereinafter, part 54 of the second transparent layer).

Specifically, among the layers 5a(1), . . . , the layer 5a(1) at the top and the layer at the bottom not illustrated in FIG. 1B each include the part 54 of the second transparent layer alone. Then, layers each having the part 54 of the second transparent layer on the outer side of the part 53 (colored part) of the colored layer (the layer 5a(2) directly below the uppermost layer 5a(1) alone is illustrated in FIG. 1B) are formed on the opposing side (inner side) of the layers 5a. On the further inner side are formed layers each having the part 54 of the second transparent layer, part 53 of the colored layer, and part 52 (transparent part) of the first transparent layer arranged in this order from their outer ends toward the object center (the layer 5a(3) directly below the layer 5a(2) alone is illustrated in FIG. 1B). On the even further inner side are formed layers each having the part 54 of the second transparent layer, part 53 of the colored layer, and part 52 of the first transparent layer, and part 51 (light-reflective part) of the light-reflective layer 1 arranged in this order from their outer ends toward the object center (the layer 5a(4) directly below the layer 5a(3) alone is illustrated in FIG. 1B). In an intermediate region between these layers are formed layers each having the part 54 of the second transparent layer, part 53 of the colored layer, part 52 of the first transparent layer, part 51 of the light-reflective layer, and part 50 of the molded layer arranged in this order from their outer ends toward the object center (the layers 5a(5) and 5a(6) are illustrated in FIG. 1B). In this manner, all of the layers from the bottom layer to the top layer 5a(1) in the Z-axis direction may be successfully formed by the inkjet printing and lamination technique. In connection with the numbers of the respective layers to be desirably formed, the structure illustrated in FIG. 1B is a non-limiting example. Further, the layers 5a(1), . . . may not necessarily be arranged as described in so far as the three-dimensional object 5 illustrated in FIG. 1A can be fabricated by the lamination technique.

As illustrated in FIG. 1B, the plurality of layers 5a(1), 5a(2), 5a(3), 5a(4), 5a(5), . . . are stacked on one another in the Z-axis direction. The parts 54 of the second transparent layer in these layers 5a(1), 5a(2), 5a(3), 5a(4), 5a(5), . . . are substantially continuous along the outermost surface of the three-dimensional object 5, constituting the second transparent layer 4. The layers 5a(2), 5a(3), 5a(4), 5a(5), . . . include the parts 53 of the colored layer. The parts 53 of the colored layer respectively included in these layers 5a(2), 5a(3), 5a(4), 5a(5), . . . are substantially continuous along the outermost surface of the three-dimensional object 5, constituting the colored layer 3. The layers 5a(3), 5a(4), 5a(5), . . . include the parts 52 of the first transparent layer. The parts 52 of the first transparent layer respectively included in these layers 5a(3), 5a(4), 5a(5), . . . are substantially continuous along the outermost surface of the three-dimensional object 5, constituting the first transparent layer 2. The layers 5a(4), 5a(5), include the parts 51 of the light-reflective layer. The parts 51 of the light-reflective layer respectively included in these layers 5a(4), 5a(5), are substantially continuous along the outermost surface of the three-dimensional object 5, constituting the light-reflective layer 1. The layers 5a(5), 5a(6), . . . include the parts 50 of the molded layer. The parts 50 of the molded layer stacked on one another in these layers 5a(5), 5a(6), . . . constitute the molded layer M.

As stated earlier, the three-dimensional object 5 has a substantially cylindrical shape formed by the upper, lower, and side surfaces that are flat and the surfaces curved from its side surface to the upper and lower surfaces. This represents the shape of the colored layer 3 formed along the outermost surface of this object, as well as the outer shape of the three-dimensional object 5 (FIG. 1B shows a macroscopic view of the colored image profile with a broken line). The colored layer 3 may be roughly divided into a horizontal surface area H, a curved surface area R, and a vertical surface area V. In the horizontal surface area H and the curved surface area R, the parts 53 of the colored layer are slightly displaced from one another. In the vertical surface area V, the parts 53 of the colored layer are stacked on one another in the Z-axis direction. The horizontal surface area H and the curved surface area R may involve the risk of being degraded in color tone when the three-dimensional object is seen in a certain direction. This risk may depend on positions of the parts 53 of the colored layer relative to one another.

This issue is hereinafter described referring to FIGS. 14A and 14B.

Figure 14A:
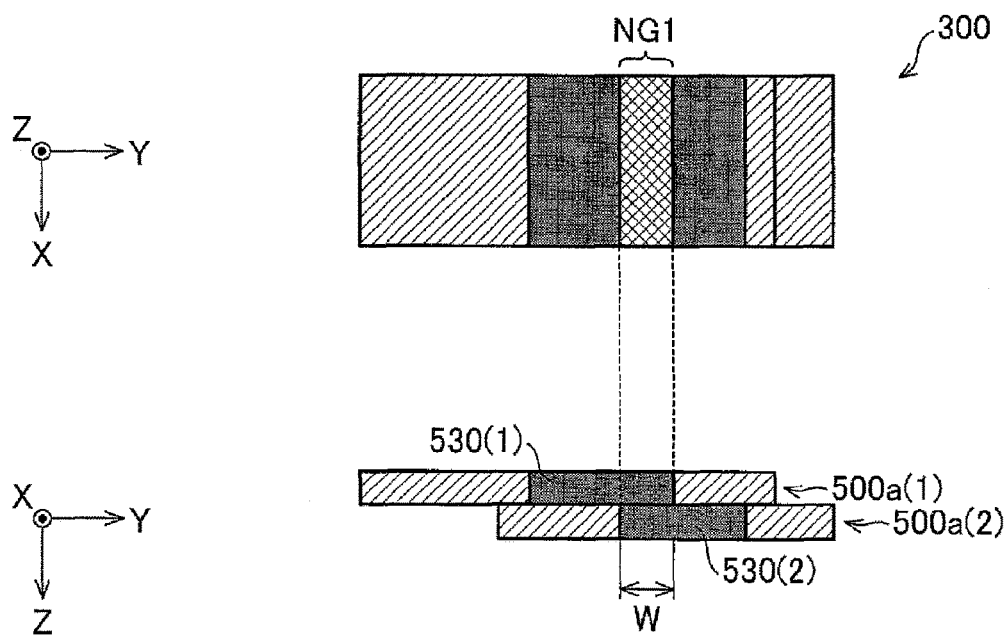
FIGS. 14A and 14B are diagrams for comparison.
Figure 14B:
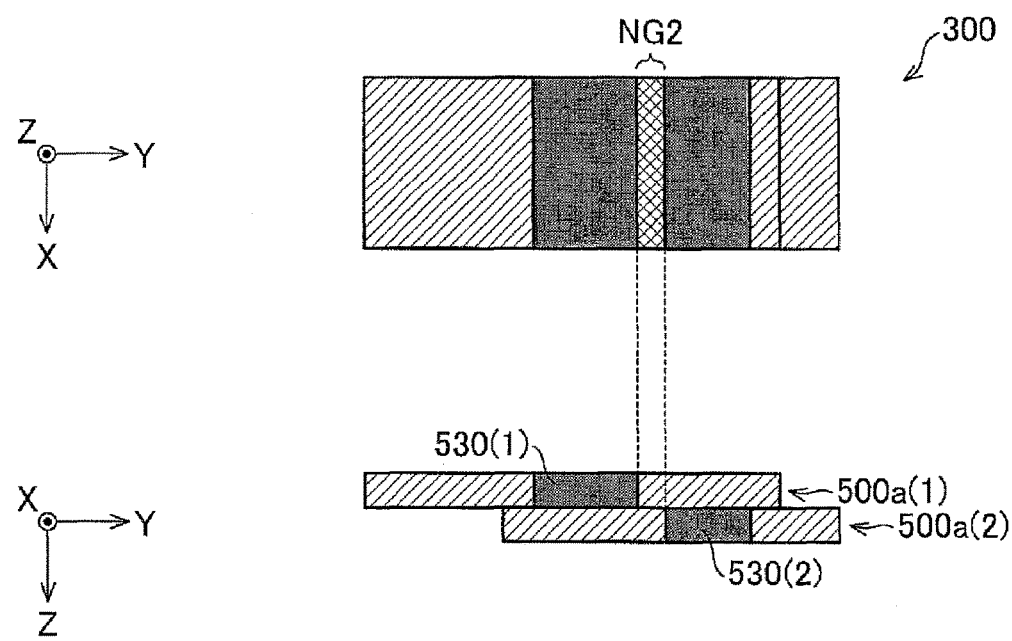

FIGS. 14A and 14B are partial diagrams of multilayered structures of three-dimensional objects for comparison. FIGS. 14A and 14B illustrate two vertically adjacent layers 500a(1) and 500a(2). In the layers 500a(1) and 500a(2), parts 530(1) and 530(2) of the colored layer are positionally displaced from each other as in the horizontal surface area H and the curved surface area R illustrated in FIG. 1B. These parts 530(1) and 530(2) of the colored layer formed in continuity constitute a colored layer 300.

Assuming that the parts 530(1) and 530(2) of a colored layer exhibit a desired color tone, the part 530(2) of the colored layer included in the layer 500a(2) and the part 530(1) of the colored layer included in the layer 500a(1) partly overlap each other in the multilayered structure for comparison illustrated in FIG. 14A. In an upper view of the multilayered structure, an overlap region w may be visually recognized as a region NG1 darker in color tone than a desired color tone, as illustrated on the upper side in FIG. 14A.

In the multilayered structure for comparison illustrated in FIG. 14B, there is no continuity between the parts 530(2) of the colored layer and the parts 530(1), leaving a gap therebetween. In an upper view of this multilayered structure, the gap may be visually recognized as a color loss NG2 in a part of the colored layer 300.

This may occur because of difficulty in accurately forming the parts 530(1) and 530(2) of the colored layer (in exact continuity with neither overlap nor gap) at the time of forming the layers 500a(1) and 500a(2) by depositing the inks by ink jet printing.

This embodiment, by avoiding the occurrence of such an event, may provide the colored layer 3 exhibiting a desired color tone (three-dimensional object 5) even when the horizontal surface area H and the curved surface area R in FIG. 1B are seen in every direction.

[1-2] Multilayered Structure in Horizontal Surface Area H and Curved Surface Area R To accomplish the colored layer 3 (three-dimensional object 5) exhibiting a desired color tone even when the horizontal surface area H and the curved surface area R in FIG. 1B are seen in every direction, this embodiment, among the layers 5a(2), 5a(3), . . . including the parts 53 of the colored layer and present in the horizontal surface area H and the curved surface area R of the three-dimensional object 5, focuses on layers having their parts 53 of the colored layer slightly displaced from and partly overlapping each other in the layer-stacking direction. Specifically, a discharged ink volume per unit volume of the coloring ink is reduced to a smaller volume in an overlap region of the parts 53 of the color layer in these layers than in any other non-overlap region, i.e., the remainder (of the parts 53 of the colored layer) adjacent to the overlap region in a direction perpendicular to the layer-stacking direction (adjacent regions).

This feature is hereinafter described in detail referring to the layers 5a(4) and 5a(5) illustrated in FIG. 1B as a part of the layers of the three-dimensional object 5 according to this embodiment.

FIG. 2 is a diagram of the layer 5a(4) along the X-Y plane.

As illustrated in FIG. 2, the layer 5a(4) has an elliptical shape. In this layer, the part 54 of the second transparent layer, part 53 of the colored layer (colored part), part 52 of the first transparent layer (transparent part), and part 51 of the light-reflective layer (light-reflective part) are arranged in the mentioned order from the outer side toward the center of this layer.

The part 53 of the colored layer is formed along the inner circumference of the annular part 54 of the second transparent layer. The part 53 of the colored layer includes an annular first colored region 53a (any region but the overlap region, non-overlap region, or adjacent region), and an annular second colored region 53b formed along the inner and outer circumferences of the first colored region 53a (overlap region). The part 53 of the colored layer in the layer 5a(4) includes the second colored region 53b, first colored region 53a, and second colored region 53b arranged in this order from the center (central) side toward the outer side of this layer.

The second colored regions 53b on the inner and outer sides of the first colored region 53a are equal in width (w) along the inward direction (radial direction) of the layer 5a(4). The part 53 of the colored layer along the inward direction (radial direction) of the layer 5a(4) has a width greater than 2w.

The first and second colored regions 53a and 53b are all made of an ink including a coloring ink. Two facts to be noted about these regions are; the discharged ink volume of the coloring ink per unit volume in the second colored region 53b is smaller than in the first colored region 53a, and the layers 5a(4) and 5a(5) are stacked on each other with an overlap between the second colored regions 53b in their parts 53 of the colored layer.

In an upper view, therefore, the first colored region 53a formed in one layer 5a(4), as a part of the colored layer 3, can independently exhibit a desired color tone (FIGS. 1A and 1B). The discharged ink volume of the coloring ink per unit volume is reduced to a smaller volume in the second colored region 53b than in the first colored region 53a. The second colored regions 53b in one layer 5a(4), therefore, is inadequate in color tone, as a part of the colored layer 3

(FIGS. 1A and 1B), when seen in an upper view. This region is only allowed to exhibit a desired color tone by an overlap with another layer.

Assuming that 100 represents the ratio of the discharged ink volume of the coloring ink per unit volume in the first colored region 53a required for a desired color tone as a part of the colored layer 3 (see FIGS. 1A and 1B), the ratio of the discharged ink volume of the coloring ink per unit volume in the second colored region 53b is less than 100.

FIGS. 3A and 3B are partial views of the multilayered three-dimensional object in which the layer 5a(4) is formed on the layer 5a(5). FIG. 3A is an upper perspective view, and FIG. 3B is a cross-sectional view of the multilayered structure of FIG. 3A taken along B-B' line. The shapes along the X-Y plane of the layers 5a(4) and 5a(5) illustrated in FIGS. 3A and 3B are rectangular to simplify the illustration.

As illustrated in FIGS. 3A and 3B, the parts 53 of the colored layer in the layers 5a(4) and 5a(5) are overlapping each other in their second colored regions 53b. The first colored region 53a adjacent to the second colored region 53b in the part 53 of the colored layer in one of the layers does not overlap at all with the part 53 of the colored layer in the other layer. In this embodiment, the lower layer 5a(5) has a greater diameter than the upper layer 5a(4), and the part 53 of the colored layer in the lower layer 5a(5) is accordingly formed at a position displaced in a diameter-enlarged direction relative to the part 53 of the colored layer in the upper layer 5a(4). Therefore, the inner second colored region 53b in the part 53 of the colored layer in the lower layer 5a(5) is overlapping with the outer second colored region 53b in the part 53 of the colored layer in the upper layer 5a(4).

In one of the layers 5a(4), the discharged ink volume of the coloring ink per unit volume is reduced to a smaller volume in the second colored region 53b than in the first colored region 53a.

Once the second colored regions 53b overlap each other, therefore, the two layers 5a(4) and 5a(5) in the overlap region viewed through light may be visually recognized as exhibiting a desired color tone as a part of the colored layer 3 (FIG. 1). In this embodiment, the discharged ink volume of the coloring ink per unit volume is regulated, so that the overlapping second colored regions 53b exhibit the same color tone as the non-overlap first colored region 53a.

In this embodiment, the ratio of the discharged ink volume of the coloring ink per unit volume in the second colored region 53b of one layer is reduced to a half (50%) of the ratio of the discharged ink volume of the coloring ink per unit volume in the first colored region 53a of the same layer (100%). The discharged ink volume of the coloring ink in total in two overlapping second colored regions 53b is divided by the discharged ink volume of the coloring ink in one second colored region 53b to calculate the ratio of the discharged ink volume of the coloring ink per unit volume. This calculated ratio equals to the ratio of the discharged ink volume of the coloring ink per unit volume in the first colored region 53a.

In FIGS. 3A and 3B, the part 53 of the colored layer in the lower layer 5a(5) is formed at a position displaced in the diameter-enlarged direction relative to the part 53 of the colored layer in the upper layer 5a(4). Therefore, the second colored region 53b closer to the outer circumference of the part 53 of the colored layer in the lower layer 5a(5) does not overlap with the part 53 of the colored layer in the upper layer 5a(4). This second colored region 53b, however, overlaps with the part 53 of the colored layer in the layer 5a(6) further below the lower layer 5a(5). The second colored region 53b closer to the inner circumference of the part 53 of the colored layer in the upper layer 5a(4) does not overlap with the part 53 of the colored layer in the lower layer 5a(5), however, overlaps with the second colored region 53b closer to the outer circumference of the layer 5a(3) formed on the upper layer 5a(4).

The discharged ink volume of the coloring ink per unit volume may be smaller in the second colored region 53b only by a very small degree than in the first colored region 53a. The ratio of the discharged ink volume of the coloring ink per unit volume in the second colored region 53b may be "90" relative to "100" set as the ratio of the discharged ink volume of the coloring ink per unit volume in the first colored region 53a in one layer. The present invention encompasses in its scope any discharged ink volumes that may even slightly improve the resulting color tone in an upper view of the overlap region (90+90=180 (<200)) as compared to the partly overlapping parts of the colored layer in which the ratio of the discharged ink volume of the coloring ink per unit volume is uniformly "100" in the whole region (100+100=200).

As described earlier, the discharged ink volume of the coloring ink in total in two overlapping second colored regions 53b is divided by the discharged ink volume of the coloring ink in one second colored region 53b to calculate the ratio of the discharged ink volume of the coloring ink per unit volume. Ideally, this calculated ratio may be equal to the ratio of the discharged ink volume of the coloring ink per unit volume in the first colored region 53a.

In any one of the layers 5a(4), 5a(5), and 5a(6), the ratio of the discharged ink volume of the coloring ink per unit volume in the second colored region 53b is reduced to a half (50%) of the ratio of the discharged ink volume of the coloring ink per unit volume in the first colored region 53a. The discharged ink volume of the coloring ink per unit volume may differ between the second colored regions 53b vertically overlapping with each other. In contrast to the ratio of the discharged ink volume of the coloring ink per unit volume being "100" in the first colored region 53a, the second colored region 53b having the ratio of the discharged ink volume of the coloring ink per unit volume being "70" may be formed so as to overlap with the second colored region 53b having the ratio of the discharged ink volume of the coloring ink per unit volume being "30".

Thus, the second colored regions 53b having the discharged ink volume of the coloring ink per unit volume smaller than in the first colored region 53a are stacked on each other in the horizontal surface area H and the curved surface area R of the three-dimensional object 5. In these areas, the colored layer 3 may be unlikely to degrade in color tone. On the contrary, the colored layer 3 may exhibit a desired color tone when the surface of the three-dimensional object 5 is viewed in any direction among the X, Y, and Z directions.

In the three-dimensional object 5, the second transparent layer 4, colored layer 3, first transparent layer 2, and light-reflective layer 1 are arranged in this order from the outer-surface side toward the center. This three-dimensional object may be visually recognized as exhibiting color tone produced by subtractive color mixture.

FIG. 1B illustrates the partly overlapping parts 52 of the first transparent layer in a frame s1 encircled with a broken line. FIG. 1B further illustrates the partly overlapping parts 51 of the light-reflective layer in vertically adjacent layers in a frame s2 encircled with a broken line. Thus having the parts of the other layers, as well as the colored layer, vertically overlap in part one another contributes to the fabrication of a conforming three-dimensional object having no color tone failure like color loss.

The discharged ink volume of the transparent ink per unit volume may be reduced to a smaller volume in the overlapping parts 52 of the first transparent layer than in the non-overlapping parts 52 of the first transparent layer. This may likewise prevent the overlapping parts from degrading in color tone, contributing to the fabrication of a conforming three-dimensional object.

The discharged ink volume of the light-reflective ink per unit volume may be reduced to a smaller volume in the overlapping parts 51 of the light-reflective layer than in the non-overlapping parts 51 of the light-reflective layer. This may prevent that the overlapping parts and the on-overlapping parts differ in light reflectance, leading to a poor color tone. As a result, a conforming three-dimensional object may be successfully obtained.

In this embodiment, the parts 53 of the colored layer in all of the layers constituting the horizontal surface area H and the curved surface area R each have the second colored region 53b, first colored region 53a, and second colored region 53b arranged in this order along the inward direction (radial direction). This is, however, a non-limiting example of the present invention. The parts 53 of the colored layer may not have the first colored region 53a but have the second colored regions 53b alone that partly overlap with the second colored regions 53b of an upper layer and further overlap in their remaining parts with the second colored regions 53b of a lower layer. In the layers thus structured, the width in total of the second colored regions 53b, i.e., the width in total of the parts 53b partly overlapping with the second colored regions of an upper layer and overlapping with the second colored regions 53b of a lower layer, results in 2w (w represents the width of the overlapping parts of two vertically adjacent layers).

[1-3] Multilayered Structure in Vertical Surface Area V

The vertical surface area V illustrated in FIG. 1B is extending substantially perpendicularly to the horizontal surface. In the layers 5a(7) to 5a(14) constituting the vertical surface area V, the parts 53 of the colored layer are almost entirely overlapping with one another. In such a region that requires almost the whole parts 53 of the colored layer to overlap with one another, the discharged ink volume of the coloring ink per unit volume in the whole parts 53 of the colored layer equals to the discharged ink volume of the coloring ink per unit volume in the second colored region 53b.

In the vertical surface area V, the parts 53 of the colored layer along the inward direction (radial direction) in the layers 5a(7) to 5a(14) each have a width twice as large as the thickness (d) of the layers 5a(7) to 5a(14) in the layer-stacking direction (2d). Thus, the discharged ink volume of the coloring ink per unit volume in the parts 53 of the colored layer in the layers 5a(7) to 5a(14) equals to the discharged ink volume of the coloring ink per unit volume in the second colored region 53b. The parts 53 of the colored layer, when viewed along the inward (inner) direction, may be prevented from degrading in color tone. The discharged ink volume of the coloring ink per unit volume is reduced to a smaller volume in the parts 53 of the colored layer in the layers 5a(7) to 5a(14) than in the first colored region 53a. Instead, the parts 53 are twice as large in thickness along the inward (inner) direction. This may prevent that the parts 53 exhibit an unsuitably weakened color tone.

[1-4] Other Technical Aspects

The description given thus far solely focuses on the matters directly relating to the distinctive technical features of the present invention. Other technical aspects of the three-dimensional object 5 illustrated in FIG. 1B are hereinafter described.

The thicknesses (heights) of the layers 5a(1), . . . in the Z direction may be decided suitably for exactness demanded for the object shape, resolution and gradation of the colored layer 3, sizes of inkjet droplets, width of the colored layer 3 along the inner direction, and the number of layers. In this embodiment that forms the layers by the lamination technique and inkjet printing, feasible thicknesses of the layers 5a(1), . . . in the Z direction should be discussed. The thickness of one of the layers 5a(1), . . . in the Z direction may be mostly in the range of 5 μm to 200 μm suitable for multicolor formation of the colored layer 3 by subtractive color mixture. In this embodiment that uses ultraviolet curing-type inks discharged by the inkjet printing to form the layers, the thickness may preferably range from 10 μm to 100 μm. In case of a large-sized object for which high resolution is not required, plural layers may be formed based on the same data, or large ink droplets may be discharged. This may promise a reduced data volume and a higher molding speed. On the contrary, in case high solution and multiple gradation levels are required of the colored layer 3, the colored layer 3 alone may be formed by plural ink droplets discharged and deposited in the Z direction a certain number of times.

Hereinafter, the following layers are further described; light-reflective layer 1 (parts 51 of the light-reflective layer), first transparent layer 2 (parts 52 of the first transparent layer), colored layer 3 (parts 53 of the colored layer), and second transparent layer 4 (parts 54 of the second transparent layer).

Light-Reflective Layer 1 (Parts 51 of the Light-Reflective Layer)

The light-reflective layer 1 (parts 51 of the light-reflective layer) is made of a white ink or a light-reflective ink. This layer has light reflectance that allows the whole range of visible lights to be reflected from at least a surface of the light-reflective layer 1 closer to the colored layer 3.

The material of the light-reflective layer (parts 51 of the light-reflective layer) may be a metallic powder-containing ink or a white pigment-containing ink, however, may preferably be a white ink. The light-reflective layer 1 made of the white ink may reflect well the light entering through the outer-surface side of the object, allowing the object to be favorably colored by subtractive color mixture.

The light-reflective layer 1 may have a thickness ranging from 5 μm to 200 μm. The thickness of the light-reflective layer 1 is equal to the width of the part 51 of the light-reflective layer included in the layers 5a along the inward direction (direction toward the center) from the outer end side thereof. This range of values is a non-limiting example of the present invention.

First Transparent Layer 2 (Parts 52 of the First Transparent Layer)

The first transparent layer 2 (parts 52 of the first transparent layer) is made of a transparent ink.

The transparent ink may be selected from any inks that can form a transparent layer having the light transmittance of 50% or more per unit thickness. The light transmittance that falls below 50% per unit thickness of the transparent layer may be likely to block light from transmitting through the layer. As a result, the object may fail to exhibit a desired color tone obtained by subtractive color mixture. An example of the inks may be an ink that imparts the light transmittance of 80% or more per unit thickness to the transparent layer, and a preferable example of the ink may be an ink that imparts the light transmittance of 90% or more per unit thickness to the transparent layer.

By interposing the first transparent layer 2 (parts 52 of the first transparent layer) between the light-reflective layer 1 (parts 51 of the light-reflective layer) and the colored layer 3 (parts 53 of the colored layer), the coloring ink used to form the colored layer 3 may be effectively prevented from bleeding into the ink used to form the light-reflective layer 1. The coloring ink of the colored layer 3 possibly bleeds into the transparent ink of the first transparent layer. Yet, the transparent ink does not pose the risk of spoiling the coloring effect of the colored layer 3, causing no change to the color tone originally intended. In the object obtained, the colored layer 3 may successfully exhibit a desired color tone (decorated as desired).

The first transparent layer 2 may have a thickness ranging from 5 μm to 20 μm. The thickness of the first transparent layer 2 is equal to the width of the part 52 of the first transparent layer included in the layers 5a along the direction toward the center from the outer end side thereof. This range of values is a non-limiting example of the present invention.

Colored Layer 3 (Parts 53 of the Colored Layer)

Example of the ink used to form the colored layer 3 (parts 53 of the colored layer) may include colorant-containing coloring inks.

Examples of the coloring ink may include inks in yellow (Y), magenta (M), cyan (C), black (K), and pale colors of these colors, and may further include inks in red (R), green (G), blue (B), and orange (Or). The inks used may have a metallic color, a pearl color, or a fluorescent color. One or more of these exemplified coloring inks may be used to produce a desired color tone.

The volume of the coloring ink used to form the first colored region 53a of the colored layer 3 (parts 53 of the colored layer) may be variable with a desired color tone (to be exhibited). When a low-concentration bright color tone is desired, therefore, the coloring ink alone is not enough for the ink packing density of the first colored regions 53a to meet a predetermined ink packing density, possibly leaving vertically uneven parts in the Z direction and/or inkless dented parts at positions along the X and Y directions. Any of such factors may result in unevenness of the object formed by the lamination technique as described in this embodiment. At the time of forming, by error diffusion method, a vertical molded surface in vicinity of the center of the multilayered structure illustrated in FIG. 1B, the number of the coloring ink droplets is at most four droplets (highest concentration) and zero at the minimum (zero concentration, that is, white color) in case one cross-sectional surface of the colored layer 3 has the ink packing density of two ink droplets in length and width; four ink droplets in total. This may likely to leave an interval equal to four droplets at the minimum number of ink droplets, leading to a significantly degraded quality in terms of the molded surface and color tone.

In this embodiment, therefore, a supplementary ink is used to increase the ink packing density of the first colored regions 53a in the colored layer 3 (parts 53 of the colored layer) in any first colored regions 53a where the coloring ink alone is not enough for the ink packing density to meet a predetermined ink packing density. In case of at most four ink droplets, three supplementary ink droplets are supplied for one coloring ink droplet, one supplementary ink droplet is supplied for three coloring ink droplets, and four supplementary ink droplets are supplied for no coloring ink droplet. The first colored regions 53a of the colored layer 3 (parts 53 of the colored layer) are formed, so that the density in total of the coloring and supplementary inks (number of ink droplets) is constantly equal. This may effectively avoid unevenness, fabricating the three-dimensional object 5 improved in elaborateness.

The amount of the coloring ink discharged and landing positions of the inks constituting the coloring ink are previously known. Therefore, the volume of the supplementary ink to be supplied and a position(s) at which the supplementary ink should be supplied (landing positions) may be determined in the light of such known information. The volume and position(s) may be determined by an inkjet head device 10 or a controller 30 (FIG. 4), or another controller.

By supplying the supplementary ink to increase the ink packing density, the first colored regions 53a of the colored layer 3 may form flat surfaces, imparting glossiness to the object.

The supplementary ink may be selected from any inks in so far as they do not adversely affect the color tone to be produced by the first colored regions 53a of the colored layer 3 (parts 53 of the colored layer). An example of the supplementary ink may be the transparent ink used to form the first transparent layer 2 (parts 52 of the first transparent layer) and the second transparent layer 4 (parts 54 of the second transparent layer).

The colored layer 3 may have a thickness ranging from 10 μm to 100 μm. The thickness of the colored layer 3 is equal to the width of the parts 53 of the colored layer included in the layers 5a(2), . . . along the direction toward the center from the outer end side thereof.

The colored layer 3 so far described in this embodiment is a non-limiting example of the present invention and may be selected from other decorative layers.

Second Transparent Layer 4 (Parts 54 of the Second Transparent Layer)

The second transparent layer 4 (parts 54 of the second transparent layer) is made of the transparent ink described referring to the first transparent layer 2 (parts 52 of the first transparent layer). The second transparent layer 4 and the first transparent layer 2 may be made of the same type of transparent ink or different types of transparent inks.

The second transparent layer 4 may preferably have a thickness greater than or equal to 10 μm. The upper-limit value of the thickness may be suitably changed in accordance with the outer dimensions of the three-dimensional object 5. The thickness of the second transparent layer 4 is equal to the width of the part 54 of the second transparent layer included in the layers 5a(1), . . . along the inner direction from the outer end side thereof.

The second transparent layer 4 serves as the protective layer of the colored layer 3 and is also useful in fabricating the three-dimensional object 5 improved in elaborateness in the present invention (this embodiment) using the lamination technique. Supposing that the colored layer 3 is the outermost layer of the three-dimensional object 5, i.e., the parts 53 of the colored layer included in the layers 5a are located at the outermost end of the object 5, it may not be possible to accurately form the colored layer 3 (parts 53 of the colored layer). By forming the second transparent layer 4 (parts 54 of the second transparent layer) as the outermost layer of the three-dimensional object 5 as described in this embodiment, the colored layer 3 (parts 53 of the colored layer) may be accurately formed. The resulting object 5 may exhibit a desired color tone.

The colored layer 3, if formed on the outermost side of the three-dimensional object 5, is exposed unprotected. Then, the colored layer 3 may be easily rubbed and faded in color and/or discolored by being exposed to ultraviolet light. Such color fading and/or discoloration of the colored layer 3 may be prevented in this embodiment by forming the second transparent layer 4 (parts 54 of the second transparent layer) as the outermost layer of the three-dimensional object 5.

The specifics of the first and second colored regions 53a and 53b in the horizontal surface area H and the curved surface area R are hereinafter described in combination with the three-dimensional object fabrication device and three-dimensional object fabrication method disclosed herein.

[2] Three-Dimensional Object Fabrication Device

Figure 4:
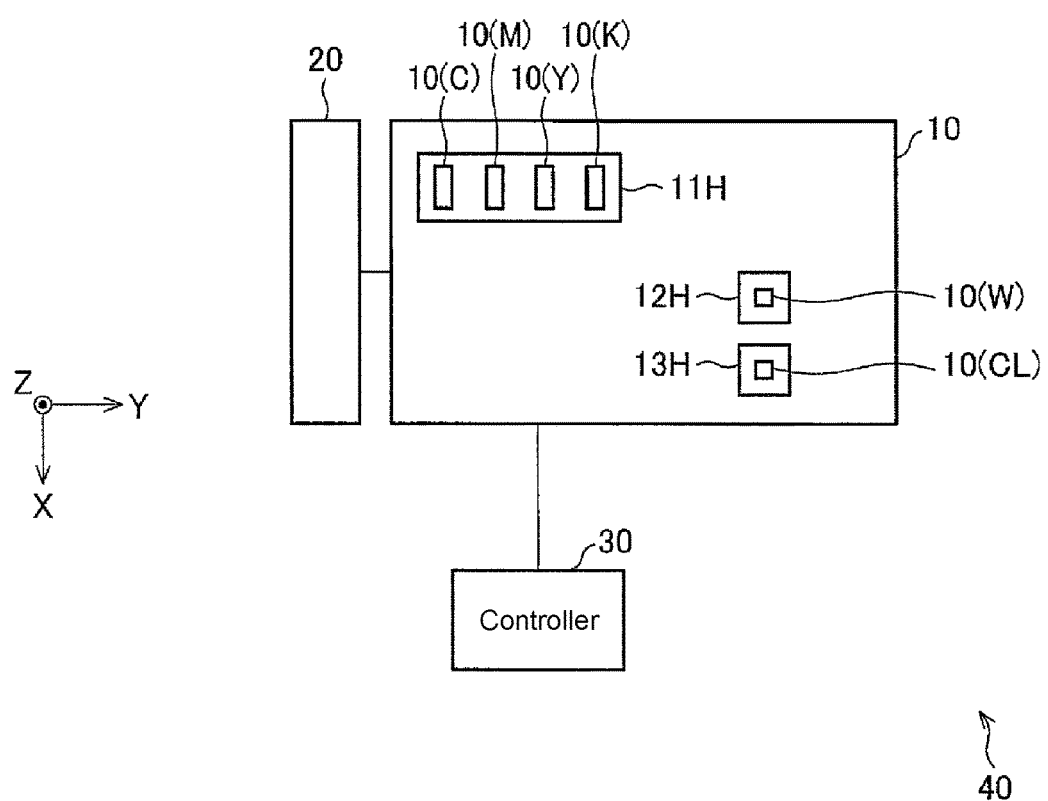
FIG. 4 is a diagram of principal structural components in the three-dimensional object fabrication device according to one embodiment of the present invention.

FIG. 4 is a diagram of principal structural components in the three-dimensional object fabrication device according to this embodiment.

A three-dimensional object fabrication device 40 according to this embodiment has an inkjet head device 10 (formation unit, second formation unit, third formation unit, fourth formation unit), an ultraviolet irradiator 20, and a controller 30 (formation unit, second formation unit, third formation unit, fourth formation unit).

Inkjet Head Device 10

On the lower surface of the inkjet head device 10 illustrated in FIG. 4 are mounted three ink jet heads 11H to 13H. As illustrated in FIG. 4, the positions of the first ink jet head 11H, second ink jet head 12H, and third ink jet head 13H are displaced from one another in the X direction. As illustrated in FIG. 4, the positions of the first ink jet head 11H, second ink jet head 12H, and third ink jet head 13H are also displaced from one another in the Y direction. These ink jet heads 11H to 13H are disposed in the generally called staggered arrangement.

The first ink jet head 11H has a cyan ink nozzle 10(c) that discharges a cyan ink, a magenta ink nozzle 10(M) that discharges a magenta ink, a yellow ink nozzle 10(Y) that discharges a yellow ink, and a black ink nozzle 10(K) that discharges a black ink. The arrangement and the number of the nozzles 10(c), 10(M), 10(Y), and 10(K) are not necessarily limited to the illustration of FIG. 4. The inks discharged through these nozzles are examples of the coloring ink used to form the colored layer 3 (parts 53 of the colored layer) illustrated in FIG. 1B.

The second ink jet head 12H has a white ink nozzle 10(W) that discharges a white ink (W). The white ink (W) is used to form the light-reflective layer 1 (parts 51 of the light-reflective layer 1) illustrated in FIG. 1B.

The third ink jet head 13H has a transparent ink nozzle 10(CL) that discharges a transparent ink (CL). The transparent ink (CL) is used to form the first transparent layer 2 (parts 52 of the first transparent layer) illustrated in FIG. 1B, and the second transparent layer 4 (parts 54 of the second transparent layer) illustrated in FIGS. 1A and 1B.

The ink used to form the molded layer M (parts 50 of the molded layer) may be any one of the inks discharged through the nozzles described so far, or an exclusive ink discharged through a nozzle provided in addition to the before-mentioned nozzles.

The inkjet head device 10 is disposed so as to have its lower surface illustrated in FIG. 4 face the surface of a table on which the object is formed (see the formation surface D of the table in FIG. 6) or face a layer formed on the table. The inkjet head device 10 can reciprocate in the X direction and discharges the inks while moving in this direction. The movement of the inkjet head device 10 is controlled by the controller 30 described later.

In connection with the movement, the inkjet head device 10 may be moved in a predetermined direction in the XYZ coordinate system, or the formation surface D may be moved in the predetermined direction in the XYZ coordinate system in so far as relative positions of the inkjet head device 10 and the formation surface D change in the predetermined direction.

Ultraviolet Irradiator 20

The ultraviolet irradiator 20 has a light source that radiates ultraviolet light to cure the ultraviolet curing-type inks discharged from the inkjet head device 10. The ultraviolet irradiator 20 is disposed in vicinity of the inkjet head device 10, so that the inks discharged from the inkjet head device 10 are irradiated with ultraviolet light. The ultraviolet irradiation from the ultraviolet irradiator 20 is controlled by a controller not illustrated in the drawing.

Controller 30

The controller 30, based on pattern data, prompts one of the nozzles of the inkjet head device 10 to discharge the ink and controls the ink discharge amount and the discharge driving force. To create the pattern data, the design and mechanism of interior and exterior shapes of the three-dimensional object 5 to be fabricated are transformed into a data format by a three-dimensional CAD, and the obtained data is sliced by a computer into multilayered pattern data.

The inks are discharged by applying voltage to the inkjet head device 10 from a power source not illustrated in the drawing. The ink amount and the discharge driving force are controlled by regulating an amount of voltage applied to the ink discharging nozzle of the inkjet head device 10. The controller 30 further controls the movement of the inkjet head device 10 as described earlier.

By having the controller 30 control the inkjet head device 10, the three-dimensional object 5 illustrated in FIGS. 1A and 1B is fabricated by the lamination technique. The first and second colored regions 53a and 53b illustrated in FIGS. 2 and 3 are formed by having the controller 30 control the inkjet head device 10.

Figure 5:
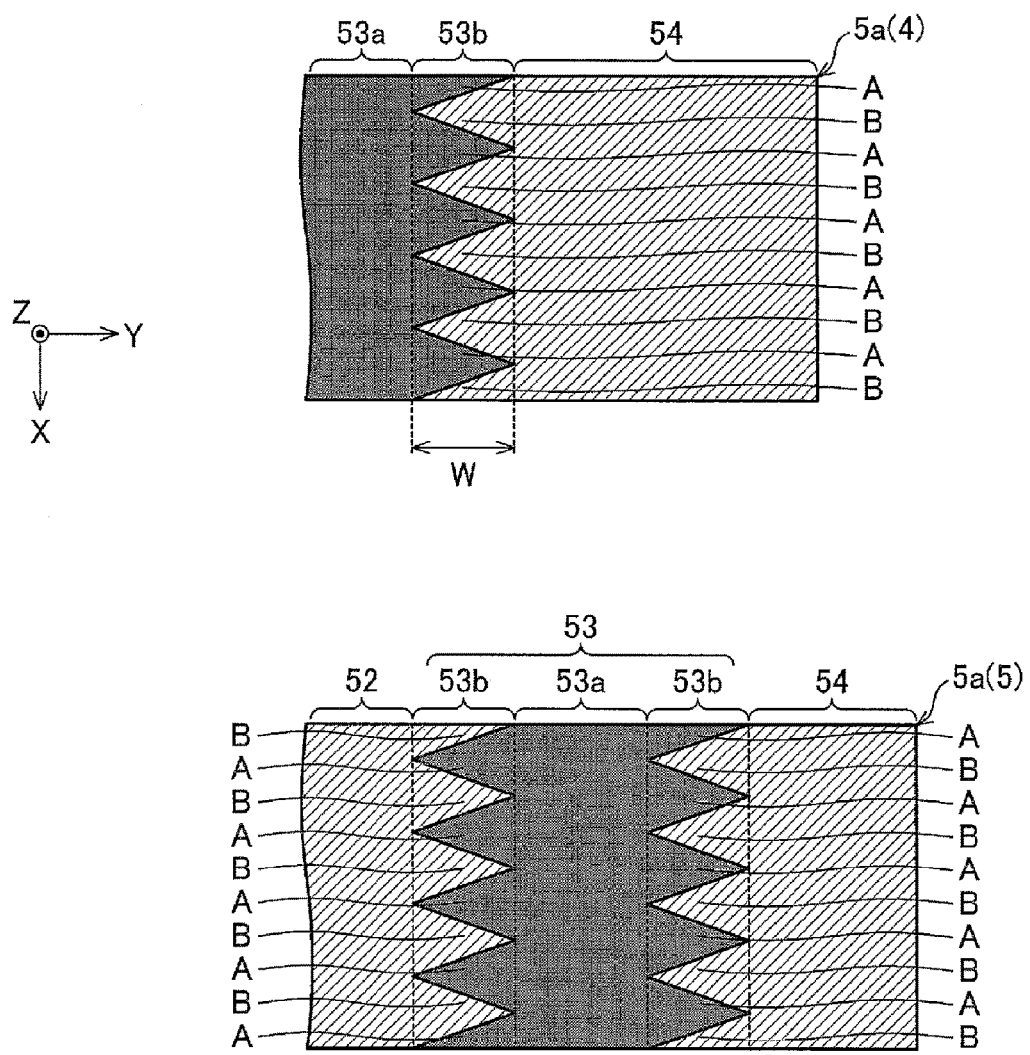
FIG. 5 is a partial view of a multilayered three-dimensional object obtained by the three-dimensional object fabrication device and the three-dimensional object fabrication method according to one embodiment of the present invention.

FIG. 5 are views of a specific example of FIGS. 3A and 3B, partly illustrating the layers 5a(4) and 5a(5) of the three-dimensional object 5 along the X-Y plane. FIG. 5 illustrate specific features alone of the layers 5a(4) and 5a(5) illustrated in a rectangular shape along the X-Y plane similarly to FIGS. 3A and 3B.

In FIG. 5, the second colored regions 53b adjacent to the first colored region 53a in the layers 5a(4) and 5a(5) have coloring ink deposited regions A and transparent ink deposited regions B.

The coloring ink deposited region A in the second colored region 53b has the same shape in the Z direction as the coloring ink deposited region of the first colored region 53a. The coloring ink deposited regions A have a shape in which a plurality of triangles are arranged in the X direction along the X-Y plane illustrated in FIG. 5. Though the first and second colored regions 53a and 53b are illustrated in the same depth of color in FIG. 5 to simplify the illustration, the coloring ink droplets in numbers corresponding to concentrations in the image data are discharged to positions indicated by the image data in the respective regions.

The transparent ink deposited region B of the second colored region 53b is a region in which the transparent ink alone is deposited. The transparent ink deposited regions B, in which the plurality of triangles are arranged in the X direction along the X-Y plane illustrated in FIG. 5, have a shape symmetric to the coloring ink deposited regions A. The transparent ink used to form the transparent ink deposited region B is discharged through the transparent ink nozzle 10(CL) of the inkjet head device 10 (FIG. 4).

The amount of ink deposited in the coloring ink deposited regions A accounts for a half of the whole ink consumption of the second colored regions 53b. The amount of ink deposited in the transparent ink deposited regions B accounts for another half of the whole ink consumption of the second colored regions 53b. The discharged ink volume of the coloring ink per unit volume in the second colored regions 53b along the X-Y plane is a half of the discharged ink volume of the coloring ink per unit volume in the first colored region 53a.

The controller 30 forms the coloring ink deposited regions A and the transparent ink deposited regions B shaped as illustrated in FIG. 5 by regulating the inks discharged from the inkjet head device 10.

The controller 30 forms the part 53 of the colored layer in the lower layer 5a(5), and then forms the upper layer 5a(4) on the lower layer 5a(5) so as to have the second colored regions 53b in the part 53 of the colored layer in the upper layer 5a(4) overlap the second colored regions 53b in the part 53 of the colored layer of the lower layer 5a(5). At the time, the controller 30 forms the transparent ink deposited regions B on the coloring ink deposited regions A in the second colored regions 53b of the lower layer 5a(5), and forms the coloring ink deposited regions A on the transparent ink deposited regions B in the second colored regions 53b of the lower layer 5a(5).

Thus, the transparent ink deposited regions B and the coloring ink deposited regions A are reversely formed in the vertically adjacent layers. Then, in an upper view through light of these layers, the coloring ink concentration in the overlap region w equals to the coloring ink concentration in the first colored region 53a.

After having the parts 53 of the colored layer partly overlap one another in the layer-stacking direction, therefore, no difference is caused between the coloring ink concentrations in the overlap region and the non-overlap region. This may avoid that the overlapping parts is visually recognized in a darker color, or color loss is recognized.

As illustrated in FIG. 1B, the part 53 of the colored layer along the inward direction (radial direction) in a layer having the second colored region 53b, first colored region 53a, and second colored region 53b arranged in this order from the inner side toward the outer side has a width greater than twice of the width (w) of the overlap region (>2w).

The three-dimensional object fabrication device 40 according to this embodiment may provide a conforming three-dimensional object 5 degraded in color tone in neither of the horizontal surface area H nor the curved surface area R of the colored layer 3.

The three-dimensional object fabrication device 40 according to this embodiment forms the layers 5a(7) to 5a(14) constituting the vertical surface area V of the three-dimensional object 5 so as to have the parts 53 of the colored layer almost entirely overlap one another. In such a region that requires almost the whole parts 53 of the colored layer to overlap one another, the discharged ink volume of the coloring ink per unit volume in the whole parts 53 of the colored layer equals to the discharged ink volume of the coloring ink per unit volume in the second colored regions 53b. The part 53 of the colored layer in the layers 5a(7) to 5a(14) constituting the vertical surface area V of the three-dimensional object 5 has the coloring ink deposited regions A and the transparent ink deposited regions B shaped as illustrated in FIG. 5.

By thus forming the parts 53 of the colored layer in the vertical surface area V, the coloring ink concentration when the overlapping parts are viewed through light in the inward direction of the object equals to the coloring ink concentration in the first colored region 53a.

In the vertical surface area V, the three-dimensional object fabrication device 40 of this embodiment sets the width of the parts 53 of the colored layer along the inward direction (radial direction) in the layers 5a(7) to 5a(14) to a width twice (2d) as large as the thickness (d) of the layers 5a(7) to 5a(14) in the layer-stacking direction. By thus forming the parts 53 of the colored layer in the vertical surface area V, the object viewed from the inward direction (radial direction) presents no color tone failure. The discharged ink volume of the coloring ink per unit volume is reduced to a smaller volume in the parts 53 of the colored layer in the layers 5a(7) to 5a(14) than in the first colored region 53a. The parts 53 formed in a doubled thickness along the inward direction (radial direction) may effectively avoid an unsuitably weakened color tone.

The controller 30 may be configured as a logic circuit (hardware) mounted in an integrated circuit (IC chip), or may function by having a CPU (Central Processing Unit) run a software program. In the latter case, the controller 30 includes a CPU that executes commands of the software program for the respective functions, a ROM (read-only memory) in which the program and various pieces of data are recorded in a computer (or CPU)-readable manner, a recording device (referred to as "recording medium") and a RAM (random-access memory) for deploying the program. The computer (or CPU) reads the program from the recording medium and runs the program to achieve the technical aspects described in the present invention. Examples of the recording medium may include "non-transitory tangible media, such as tapes, discs, cards, semiconductor memories, and programmable logic circuits. The program may be supplied to the computer through an optional transmission medium (communication network or broadcast waves) on which the program is transmittable. The technical aspects described in the present invention may be achieved by way of data signals embedded in carrier waves through which the program is electronically transmitted.

[3] Three-Dimensional Object Fabrication Method

The three-dimensional object fabrication method uses the three-dimensional object fabrication device 40 according to this embodiment. The three-dimensional object fabrication method includes a formation step of forming the overlapping second colored regions 53b and the first colored region 53a adjacent to the overlapping second colored regions 53b as the part 53 of the colored layer in each of the layers constituting the horizontal surface area H and the curved surface area R. The formation step forms these regions in a manner that the discharged ink volume of the coloring ink per unit volume is reduced to a smaller volume in the overlapping second colored regions 53b than in the first colored region 53a. This method may fabricate the three-dimensional object 5 with no color tone failure in the horizontal surface area H or the curved surface area R.

Hereinafter, steps in the method of fabricating the whole structure of the three-dimensional object 5 including the horizontal surface area H and the curved surface area R is hereinafter described referring to FIGS. 6A to 6E.

FIGS. 6A to 6E are cross-sectional views schematically illustrating steps of fabricating (manufacturing) the whole structure of the three-dimensional object 5 according to this embodiment. These views illustrate steps of fabricating (manufacturing) a lower-end region of the three-dimensional object 5 including the horizontal surface area H and the curved surface area R illustrated in FIG. 1B.

Figure 6A:
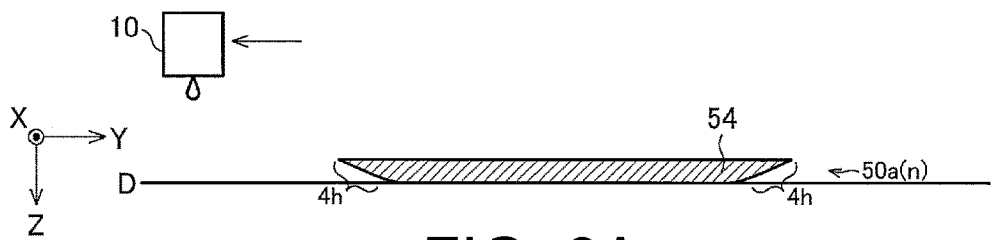
FIGS. 6A to 6E are each a cross-sectional view illustrating a step of fabricating the three-dimensional object using the three-dimensional object fabrication method according to one embodiment of the present invention.

First, a lowermost layer 5a (hereinafter referred to as an (n)th layer 5a(n)) is formed on the formation surface D of the table provided as an object fabrication table, as illustrated in FIG. 6A. In the step of forming the (n)th layer 5a(n), the transparent ink is discharged at a predetermined timing from the inkjet head device 10 by the inkjet printing, and the discharged ink is irradiated with ultraviolet light and cured to form the (n)th layer 5a(n) solely having the part 54 of the second transparent layer. On the outer end of the (n)th layer 5a(n) is formed an overhanging part 4h diametrically larger by degrees in the layer-stacking direction. To form the overhanging part 4h, the inkjet head device 10 may be further equipped with an additional ink jet head to form a support layer on the outer side of the object to be formed.

Figure 6B:
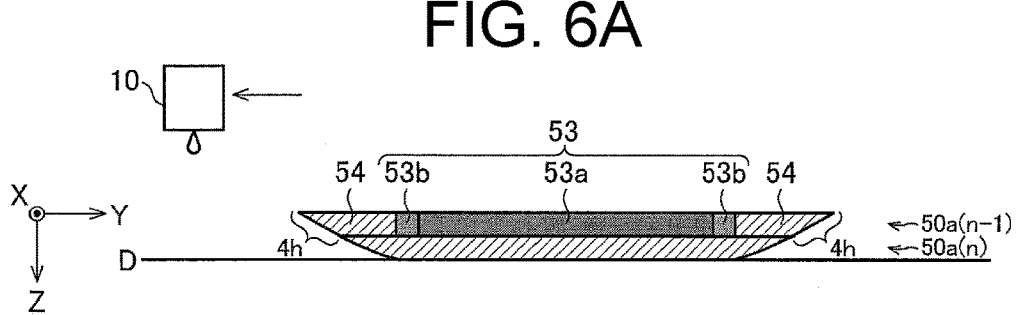

Next, an (n−1)th layer 5a(n−1) is formed on the (n)th layer 5a(n), as illustrated in FIG. 6B. In the step of forming the (n−1)th layer 5a(n−1), the inkjet head device 10 moves over the (n)th layer 5a(n) already formed and discharges the ink at a predetermined timing. Then, the discharged ink is irradiated with ultraviolet light and cured to form the (n−1)th layer 5a(n−1) including the part 53 of the colored layer in its center part and the part 54 of the second transparent layer surrounding the part 53 of the colored layer. At the time, the first colored region 53a and the second colored regions 53b are formed in the part 53 of the colored layer.

The part 53 of the colored layer and the part 54 of the second transparent layer may be formed synchronously, or one of the part 53 of the colored layer and the part 54 of the second transparent layer may be formed before the other one.

Figure 6C:
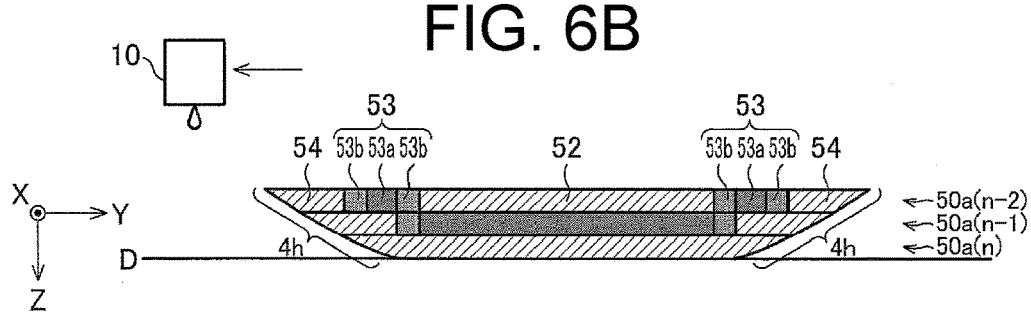

Next, an (n−2)th layer 5a(n−2) is formed on the (n−1)th layer 5a(n−1), as illustrated in FIG. 6C. In the step of forming the (n−2)th layer 5a(n−2), the inkjet head device 10 moves over the (n−1)th layer 5a(n−1) already formed and discharges the ink at a predetermined timing. The discharged ink is irradiated with ultraviolet light and thereby cured. The (n−2)th layer 5a(n−2) is formed so as to include, from the radial center toward the end of this layer, the part 52 of the first transparent layer, part 53 of the colored layer, and part 54 of second transparent layer in the mentioned order. At the time, the first colored region 53a and the second colored regions 53b are formed in the part 53 of the colored layer. By controlling positions at which the second colored regions 53b are formed, the second colored regions 53b are formed so as to overlap with the second colored regions 53b of the (n−1)th layer 5a(n−1) formed therebelow.

In the step of forming the (n−2)th layer 5a(n−2), the part 52 of the first transparent layer, part 53 of the colored layer, and part 54 of second transparent layer may be formed synchronously, or the part 53 of the colored layer may be formed after the part 52 of the first transparent layer and the part 54 of second transparent layer are formed.

Figure 6D:
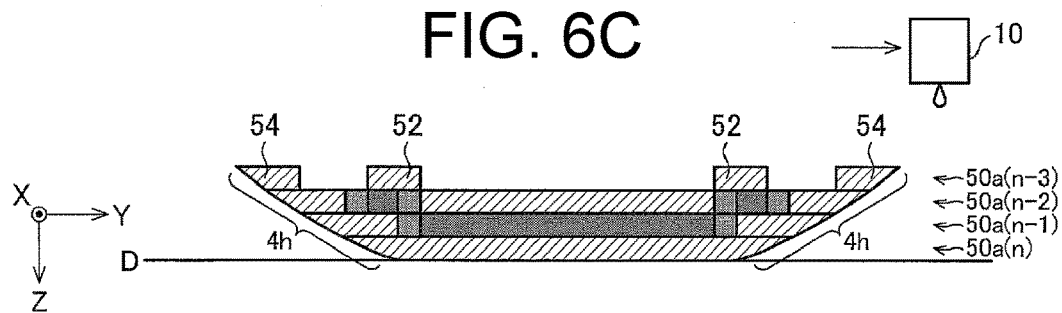
Figure 6E:
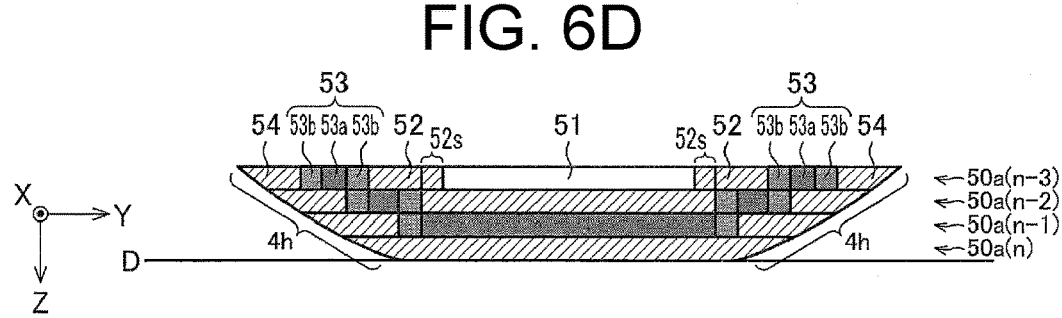

Next, an (n−3)th layer 5a(n−3) is formed on the (n−2)th layer 5a(n−2), as illustrated in FIG. 6D. In the step of forming the (n−3)th layer 5a(n−3), as illustrated in FIG. 6D, the inkjet head device 10 moves over the (n−2)th layer 5a(n−2) already formed and discharges the transparent ink at a predetermined timing. Then, the discharged transparent ink is irradiated with ultraviolet light and cured to form the part 52 of the first transparent layer and the part 54 of the second transparent layer. At the time, the overhanging part 4h is formed in the part 54 of the second transparent layer in the manner described earlier. Then, the part 51 of the light-reflective layer and the part 53 of the colored layer are formed as illustrated in FIG. 6E. At the time, the first colored region 53a and the second colored regions 53b are formed in the part 53 of the colored layer. By controlling positions at which the second colored regions 53b are formed, the second colored regions 53b are formed so as to overlap with the second colored regions 53b of the (n−2)th layer 5a(n−2) formed therebelow.

This step forms the (n−3)th layer 5a(n−3) so as to include, from the radial center toward the end of this layer, the part 51 of the light-reflective layer, part 52 of the first transparent layer, part 53 of the colored layer, and part 54 of second transparent layer in the mentioned order.

The step of forming (manufacturing) the (n−3)th layer 5a(n−3) illustrated in FIG. 6D forms the part 52 of the first transparent layer and the part 54 of the second transparent layer. Then, as illustrated in FIG. 6E, the part 53 of the colored layer and the part 51 of the light-reflective layer are formed between the part 52 of the first transparent layer and the part 54 of the second transparent layer. At the time of forming the part 53 of the colored layer, the part 54 of the second transparent layer serves as the outer moat for the ink droplets that form the part 53 of the colored layer. This may prevent the wet ink discharged to form the part 53 of the colored layer from spreading out, allowing the part 53 of the colored layer to be formed with high accuracy.

The step of forming the (n−3)th layer 5a(n−3) makes a part 52s of the part 52 of the first transparent layer overlap with the part 52 of the first transparent layer in the (n−2)th layer 5a(n−2) formed therebelow. By thus producing an overlap between the parts 52 of the first transparent layer in the vertically adjacent layers, the color tone may be more reliably prevented from degrading. FIG. 1B illustrates the partly overlapping parts 52 of the first transparent layer in the frame s1 encircled with a broken line. Though not illustrated in FIGS. 6A to 6E, FIG. 1B further illustrates, in the frame s2 encircled with a broken line, the partly overlapping parts 51 of the light-reflective layer in the vertically adjacent layers. Thus having the parts of the other layers, as well as the colored layer 3, partly vertically overlap one another greatly conduce to the fabrication of a three-dimensional object presenting no color tone failure when seen in every direction.

At the time of forming the first colored region 53a in the part 53 of the colored layer in each layer, a colored layer formation ink containing the coloring ink and the supplementary ink that amount in total to a constant volume is discharged and irradiated with ultraviolet light to be cured.

By thus stacking layers on one another in the Z direction, the horizontal surface area H and the curved surface area R of the three-dimensional object 5 may be manufactured as illustrated in FIG. 1B.

As for the formation of each layer, the known two-dimensional image formation technique, interlace scans, may enable high-quality fabrication and decoration while suppressing unevenness. A roller, not illustrated in the drawings, may be used to flatten the upper surface of each layer formed. This may deliver dimensional stability and reduce unevenness in the Z direction.

In the vertical surface area V, the parts 53 of the colored layer may have the second colored regions 53b alone, so that substantially the whole parts 53 of the colored layer overlap one another, as illustrated in FIG. 1B.

The three-dimensional object fabrication device 40 and the three-dimensional object fabrication method using this device may successfully fabricate a three-dimensional object 5 using the lamination technique in which the parts of the colored layer overlap one another in the respective layers. In an attempt to form the colored layers in a manner that the colored parts in the respective layers are continuous in the layer-stacking direction with no overlap therebetween, high-accuracy adjustments are required of positions of the colored parts to be formed in the respective layers. This may be a bottleneck in speedy fabrication of the three-dimensional object. In this embodiment, however, the layers are formed in a manner that the parts of the colored layer in the respective layers partly overlap one another. This may afford an accelerated process of fabricating the three-dimensional object. The color tone of the overlapping parts may be adjusted to exhibit a desired color tone only after the overlap is produced. As a result, a three-dimensional object with no color tone failure may be speedily fabricated.

[4] Modified Example of Second Colored Region 53b

[4-1] Modified Example 1

In the second colored region 53b of FIG. 5 described earlier, the coloring ink deposited regions A and the transparent ink deposited regions B have a shape in which a plurality of triangles are arranged in the X direction along the X-Y plane illustrated in FIG. 5. This is, however, a non-limiting example of the present invention.

Figure 7:
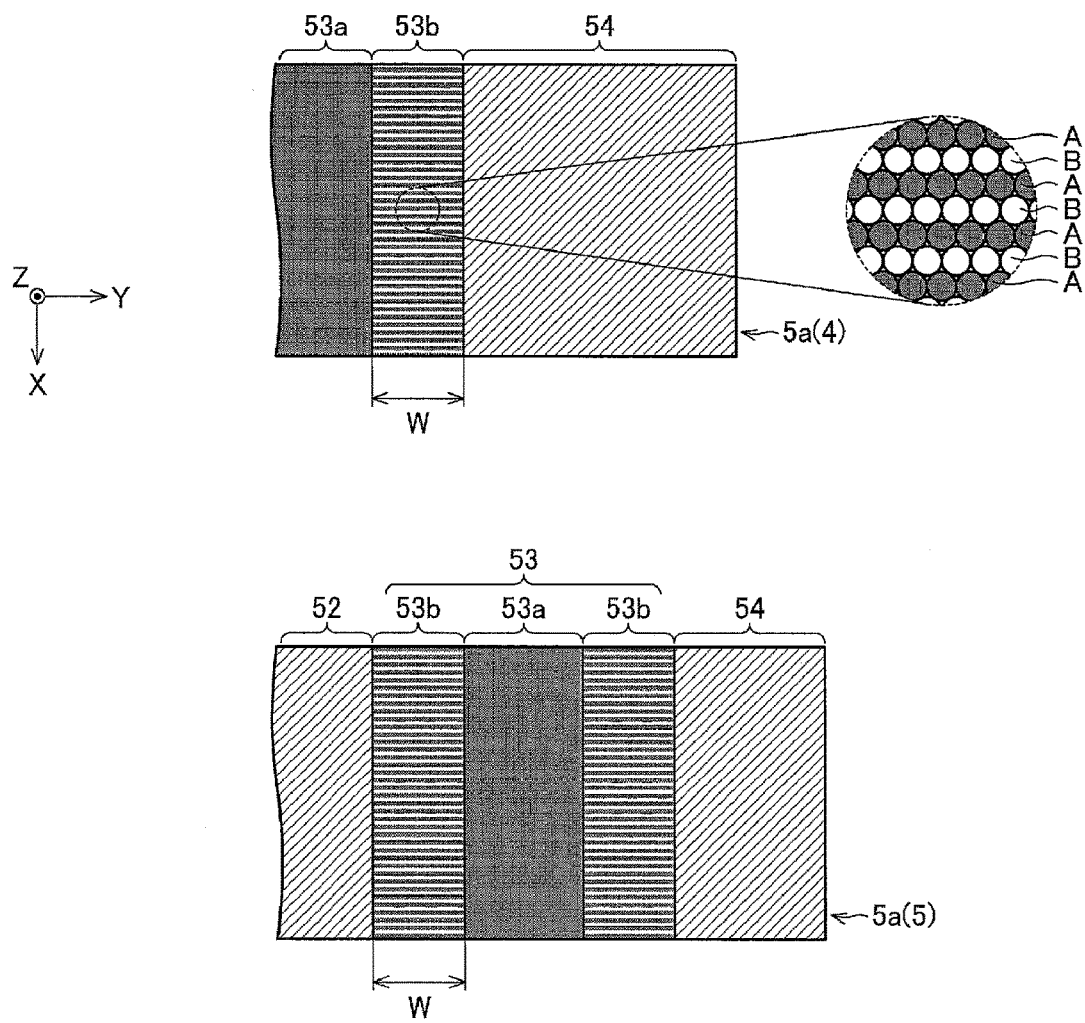
FIG. 7 is a partial view of a multilayered three-dimensional object obtained by the three-dimensional object fabrication device and the three-dimensional object fabrication method according to one embodiment of the present invention.

FIG. 7 is a view of another example of the second colored regions 53b, partly illustrating the layers 5a(4) and 5a(5) along the X-Y plane similarly to FIG. 5. The second colored region 53b illustrated in FIG. 7 has a striped pattern having the coloring ink deposited regions A and the transparent ink deposited regions B alternately arranged in the X-axis direction. The coloring ink deposited region A and the transparent ink deposited region B both have an elongated shape extending in the Y-axis direction. As seen in an enlarged view encircled with a broken line in FIG. 7, the elongated shape is sized such as to allow the plurality of ink droplets discharged through nozzles of the inkjet head device 10 (FIG. 4) to align in a row.

In case the inkjet head device 10 (FIG. 4) is structured to discharge inks respectively having the same color through plural ones of the nozzles, the elongated shape is formed in the following manner. While the inkjet head device 10 is moving in the Y-axis direction, the ink to form the coloring ink deposited regions A is successively discharged through the nozzles in even-numbered lines, and the ink to form the transparent ink deposited regions B is successively discharged through the nozzles in odd-numbered lines. This may be referred to as X direction (line) interlace scans across two vertically adjacent layers.

The ink discharge described above may be performed by having the controller 30 (FIG. 4) control the inkjet head device 10.

The second colored regions 53b are made to overlap each other in the layers 5a(4) and 5a(5), so that the transparent ink deposited regions B of the layer 5a(5) overlaps with the coloring ink deposited regions A of the layer 5a(4), and the coloring ink deposited regions A of the layer 5a(5) overlaps with the transparent ink deposited regions B of the layer 5a(4). In an upper view through light of the layers 5a(4) and 5a(5), the coloring ink deposited region A of the layer 5a(5) is seen through a gap between the coloring ink deposited regions A (transparent ink deposited region B) of the layer 5a(4). Then, the whole second colored regions 53b are visually recognized as exhibiting the same color tone as the first colored region 53a.

[4-2] Modified Example 2

Figure 8:
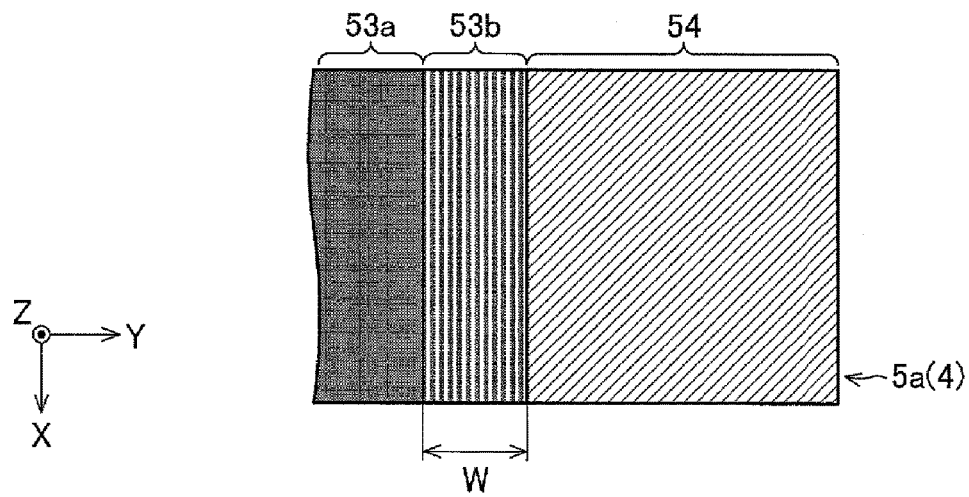
FIG. 8 is a partial view of a multilayered three-dimensional object obtained by the three-dimensional object fabrication device and the three-dimensional object fabrication method according to one embodiment of the present invention.
Figure 8:
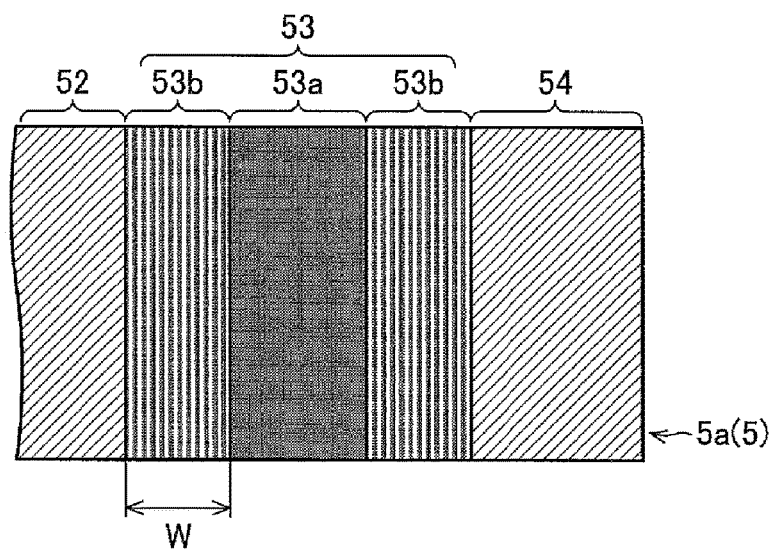

FIG. 8 shows yet another example of the coloring ink deposited region A and the transparent ink deposited region B of the second colored regions 53b.

The second colored region 53b illustrated in FIG. 8 has a striped pattern having the coloring ink deposited regions A and the transparent ink deposited regions B alternately arranged in the Y-axis direction. The coloring ink deposited region A and the transparent ink deposited region B both have an elongated shape extending in the X-axis direction. Similarly to FIG. 7, the elongated shape is sized such as to allow the plurality of ink droplets discharged through nozzles of the inkjet head device 10 (FIG. 4) to align in a row. This elongated shape may be formed by having the inkjet head device 10 (FIG. 4) moving in the X-axis direction successively discharge the inks. This may be referred to as Y direction (line) interlace scans across two vertically adjacent layers.

Similarly to FIG. 7, the second colored regions 53b illustrated in FIG. 8 are made to overlap each other in the layers 5a(4) and 5a(5), so that the transparent ink deposited regions B of the layer 5a(5) overlaps with the coloring ink deposited regions A of the layer 5a(4), and the coloring ink deposited regions A of the layer 5a(5) overlaps with the transparent ink deposited regions B of the layer 5a(4). In an upper view through light of the layers 5a(4) and 5a(5), the coloring ink deposited region A of the layer 5a(5) is seen through a gap between the coloring ink deposited regions A (transparent ink deposited region B) of the layer 5a(4). Then, the whole second colored regions 53b are visually recognized as exhibiting the same color tone as the first colored region 53a.

[4-3] Modified Example 3

Figure 9:
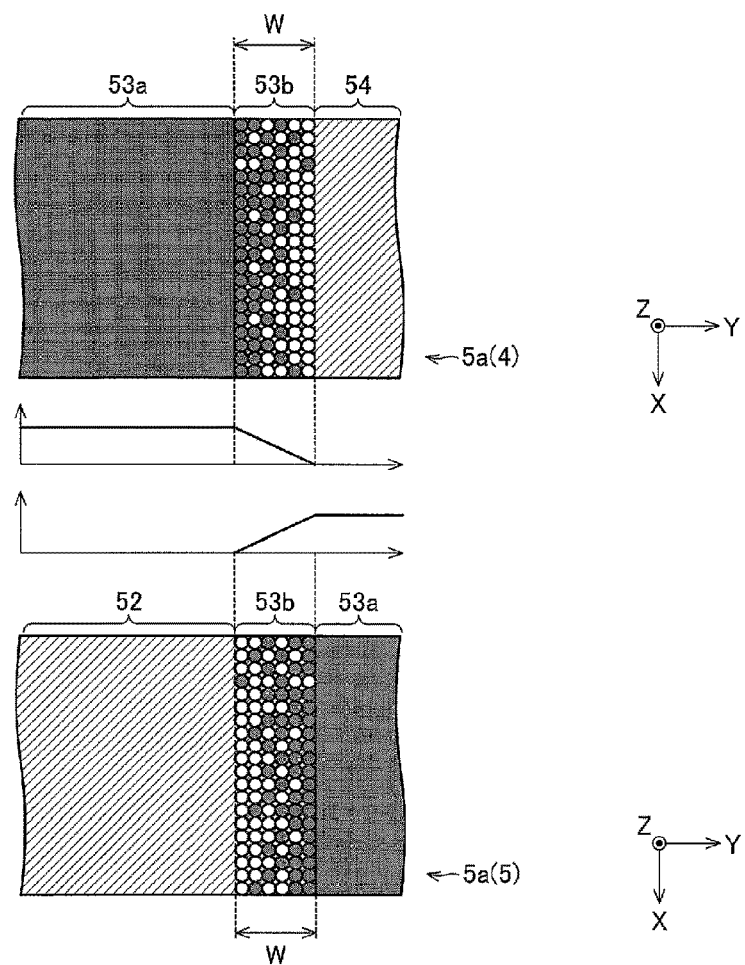
FIG. 9 is a partial view of a multilayered three-dimensional object obtained by the three-dimensional object fabrication device and the three-dimensional object fabrication method according to one embodiment of the present invention.

FIG. 9 shows yet another example of the second colored region 53b.

The second colored region 53b illustrated in FIG. 9 has such a gradient that decreases the number of pixels in the second colored region 53b of the layer 5a(4) at which the coloring ink should be recorded. The number of pixels starts to decrease at an end of this region on the side of the first colored region 53a and becomes smaller as being far from the first colored region 53a. FIG. 9 additionally illustrates a graph representing a relationship between positions and the number of pixels at which the coloring ink should be recorded. The pixels at which the coloring ink should be recorded refer to pixels where the coloring ink should be applied. The coloring ink or the supplementary ink is discharged to the pixels based on the image data.

The second colored region 53b of the layer 5a(5) that overlaps with the second colored region 53b of the layer 5a(4) has a reversed gradient. In an upper view through light of the layers 5a(4) and 5a(5) having their second colored regions 53b overlap each other, the overlap region of these layers is visually recognized as exhibiting the same color tone as the first colored region 53a.

[5] Modified Example of Inkjet Head Device

In the embodiment described so far, the inkjet head device 10 illustrated in FIG. 4 is used to manufacture the three-dimensional object 5. The illustrated inkjet head device, however, is a non-limiting example, and any one of inkjet head devices illustrated in FIGS. 10 to 13 may instead be used.

Figure 10:
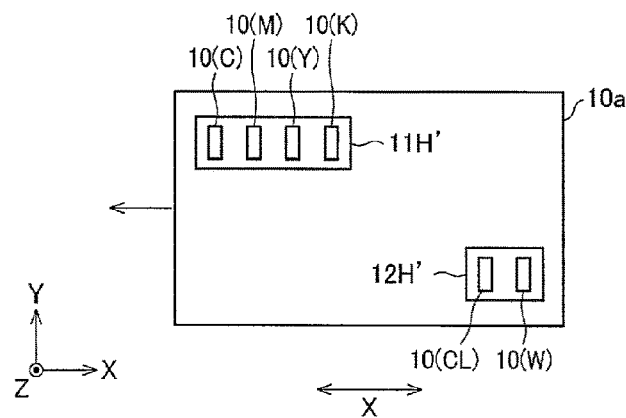
FIG. 10 is a diagram of a modified embodiment of principal structural components in the three-dimensional object fabrication device according to one embodiment of the present invention.

On the lower surface of the inkjet head device 10a illustrated in FIG. 10 are mounted two ink jet heads 11H' and 12H'. As illustrated in FIG. 10, positions of the first ink jet head 11H' and the second ink jet head 12H' are displaced from each other in the X and Y directions.

Figure 11:
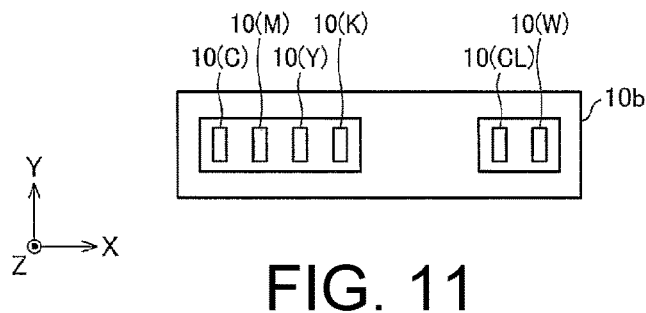
FIG. 11 is a diagram of another modified embodiment of principal structural components in the three-dimensional object fabrication device according to one embodiment of the present invention.

FIG. 11 is a modified example of the inkjet head device. On the lower surface of an inkjet head device 10b are arranged a cyan ink nozzle 10(c), a magenta ink nozzle 10(M), a yellow ink nozzle 10(Y), a black ink nozzle 10(K), a white ink nozzle 10(W), and a transparent ink nozzle 10(CL) in the mentioned order in the X direction.

Figure 12:
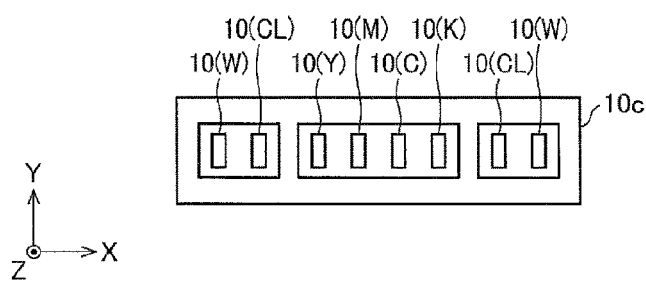
FIG. 12 is a diagram of yet another modified embodiment of principal structural components in the three-dimensional object fabrication device according to one embodiment of the present invention.

FIG. 12 is a further modified example of the inkjet head device. On the lower surface of an inkjet head device 10c illustrated in FIG. 12 are arranged a white ink nozzle 10(W), a transparent ink nozzle 10(CL), a yellow ink nozzle 10(Y), a magenta ink nozzle 10(M), a cyan ink nozzle 10(c), a black ink nozzle 10(K), a transparent ink nozzle 10 (CL), and a white ink nozzle 10(W) in the mentioned order in the X direction.

Figure 13:
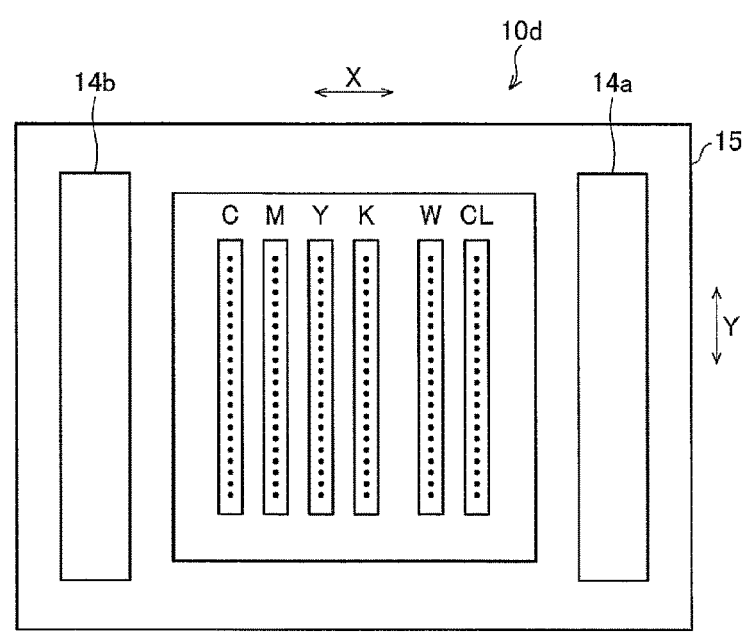
FIG. 13 is a diagram of yet another modified embodiment of principal structural components in the three-dimensional object fabrication device according to one embodiment of the present invention.

FIG. 13 is a yet further modified example of the inkjet head device. An inkjet head device 10d illustrated in FIG. 13 has a carriage 15 allowed to reciprocate along the X axis, a plurality of nozzle arrays mounted in the carriage 15, and ultraviolet irradiators 14a and 14b. In scans performed, the carriage 15 is moved in the X direction to discharge the ultraviolet curing-type inks from the nozzle arrays, and ultraviolet light is emitted from the ultraviolet irradiators 14a and 14b. The plural nozzle arrays are disposed next to one another in the X direction, as illustrated in FIG. 13. They are a cyan ink nozzle array C, a magenta ink nozzle array M, a yellow ink nozzle array Y, a black ink nozzle array K, a white ink nozzle array W, and a transparent ink nozzle array CL arranged in this order. The nozzle arrays mounted in the carriage 15 are allowed to discharge the ultraviolet curing-type inks while the carriage 15 is moving in the X direction.

In FIGS. 11, 12, and 13, all of the nozzles aligned in a row are arranged in the X direction. By moving the inkjet head device once in the X direction, all of the inks required for each layer may be discharged to form the layer. The inkjet head device illustrated in FIG. 13 discharges the inks and irradiates the inks with ultraviolet light synchronously in one movement in the X direction. When the ultraviolet curing-type inks are used, these inks may be curable to form a layer as soon as they are discharged.

[Additional Remarks]

The three-dimensional object fabrication device 40 according to an aspect of the present invention includes a formation unit (inkjet head device 10 and controller 30) that forms layers using one of a coloring ink and a transparent ink in a stacked configuration. The formation unit (inkjet head device 10 and controller 30) forms an overlap region (second colored region 53b) between the layers made of the same ink (ink used to form the parts 53 of the colored layer) in a manner that a discharged ink volume of the ink per unit volume is reduced to a smaller volume in the overlap region (second colored region 53b) than in a non-overlap region (first colored region 53a) between the layers made of the same ink but the overlap region (second colored region 53b).

This device forms the parts made of the same ink so as to overlap each other. In an attempt to form the colored layers using, for example, the coloring ink in a manner that the colored parts in the respective layers are continuous in the layer-stacking direction with no overlap therebetween, high-accuracy adjustments are required of positions of the colored parts to be formed in the respective layers (the positions need to be adjusted with great caution). This may be a bottleneck in speedy fabrication of the three-dimensional object. In this aspect, the layers are formed in a manner that the colored parts (parts 53 of the colored layer) in the layers 5a(2), partly overlap each other. This may afford an accelerated process of fabricating the three-dimensional object 5.

By having the parts made of the same ink overlap each other, the partly overlapping colored parts in the respective layers 5a(2), . . . (parts 53 of the colored layer), it may be prevented that the colored parts (parts 53 of the colored layer) included in the vertically adjacent layers 5a(2), . . . are spaced apart and presented as color loss, as described in the embodiment.

Further, the discharged ink volume of the coloring ink per unit volume is reduced to a smaller volume in the overlap region (second colored region 53b) than in the non-overlap region (first colored region 53a). The color tone of the overlap region (second colored region 53b) may be adjusted to exhibit a desired color tone only after the overlap is produced. This aspect may speedily provide the three-dimensional object 5 with a pleasant color tone by preventing such an event that the color tone is unfavorably darkened by the overlap.

In the three-dimensional object fabrication device 40 according to one aspect of the present invention, in addition to the above configuration, the overlap region is where the layers 5a(2) having the colored parts (parts 53 of the colored layer) made of an ink including the coloring ink overlap each other, and the formation unit (inkjet head device 10 and controller 30) forms, as the colored parts in the respective layers 5a(2), . . . (parts 53 of the colored layer), the overlap region (second colored region 53b) and an adjacent region (first colored region 53a) adjacent to the overlap region in a direction perpendicular to the layer-stacking direction. Further, the formation unit forms the overlap region (second colored region 53b) in a manner that a discharged ink volume of the coloring ink per unit volume is reduced to a smaller volume in the overlap region (second colored region 53b) than in the adjacent region (first colored region 53a) (horizontal surface area H, curved surface area R).

This produces an overlap between the colored parts (parts 53 of the colored layer) in the layers 5a(2), . . . in the process of fabricating the three-dimensional object 5 by the lamination technique. In an attempt to form the colored layers in a manner that the colored parts in the respective layers are continuous in the layer-stacking direction with no overlap therebetween, high-accuracy adjustments are required of positions of the colored parts to be formed in the respective layers (the positions need to be adjusted with great caution). This may be a bottleneck in speedy fabrication of the three-dimensional object. Forming the layers 5a(2), . . . so that their colored parts (parts 53 of the colored layer) overlap each other may allow the three-dimensional object 5 to be speedily fabricated.

By thus having the colored parts (parts 53 of the colored layer) in the respective layers 5a(2), . . . partly overlap each other, it may be prevented that the colored parts (parts 53 of the colored layer) included in the vertically adjacent layers 5a(2), . . . are spaced apart, giving the impression of color loss.

The three-dimensional object fabrication device 40 according to one aspect of the present invention may form the overlap region (second colored region 53b) in a manner that the discharged ink volume of the coloring ink per unit volume is reduced to a smaller volume in the overlap region than in the adjacent region (first colored region 53a). The color tone of the overlap region (second colored region 53b) may be adjusted to exhibit a desired color tone only after the overlap is produced. This aspect may speedily provide the three-dimensional object 5 with a pleasant color tone by preventing such an event that the color tone is unfavorably darkened by the overlap.

In the three-dimensional object fabrication device 40 according to one aspect of the present invention, in addition to the above configuration, the formation unit (inkjet head device 10 and controller 30) forms the overlap region (second colored region 53b) by discharging the coloring ink and the transparent ink.

In the three-dimensional object fabrication device 40 according to one aspect of the present invention, in addition to the above configuration, the formation unit (inkjet head device 10 and controller 30) forms the overlap region (second colored region 53b) in a manner that the discharged ink volume in total of the coloring ink per unit volume of the overlap region (second colored region 53b) in the vertically adjacent two layers 5a(2), . . . and the discharged ink volume of the coloring ink per unit volume of the adjacent region (first colored region 53a) in one of the layers 5a(2), . . . are equal to each other.

The color tone of the overlap region (second colored region 53b) may be adjusted to exhibit a desired color tone only after the overlap is produced (exhibit the same color tone as the adjacent region (first colored region 53a) in one of the layer 5a(2), . . . only after the overlap is produced). This aspect may speedily provide the three-dimensional object with a pleasant color tone by preventing such an event that the color tone is unfavorably darkened by the overlap.

In the three-dimensional object fabrication device 40 according to one aspect of the present invention, in addition to the above configuration, the formation unit (inkjet head device 10 and controller 30) forms a first overlap region (second colored region 53b) and a second overlap region (second colored region 53b) in the respective layers 5a(2), and the formation unit, of two of the layers 5a(2), . . . stacked on each other, makes the first overlap region (second colored region 53b) in the lower one of the layers 5a(2), . . . overlap with the second overlap region (second colored region 53b) in the upper one of the layers 5a(2), . . . or overlap with the first overlap region (second colored region 53b) in the upper one of the layers 5a(2), . . . .

According to this aspect, the colored layer 3 formed by the continuous colored parts (parts 53 of the colored layer) may be inclined in the layer-stacking direction.

In the three-dimensional object fabrication device 40 according to one aspect of the present invention, in addition to the above configuration, the formation unit (inkjet head device 10 and controller 30) forms, in each one of the layers, the first overlap region (second colored region 53b) and the second overlap region (second colored region 53b) in an equal width along an inward direction of the layer, and the colored part (parts 53 of the colored layer) has a width greater than or equal to 2w, where w is the width of the first and second overlap regions.

The three-dimensional object fabrication device 40 according to one aspect of the present invention, in addition to the above configuration, may further have a second formation unit (inkjet head device 10 and controller 30). The second formation unit forms the overlap region of the layers made of the same ink in the whole region of the layers (vertical surface area V). The second formation unit (inkjet head device 10 and controller 30) forms the overlap region in a manner that the discharged ink volume of the ink in the whole region (parts 53 of the colored layer in the layers 5a(7) to 5a(14)) per unit volume equals to the discharged ink volume of the ink (coloring ink) per unit volume in the overlap region (second colored region 53b) formed by the formation unit (inkjet head device 10 and controller 30).

According to the above configuration, the second formation unit (inkjet head device 10 and controller 30) adjusts the discharged ink volume, so that the whole region exhibits the same color tone as the overlap region (second colored region 53b). The whole region exhibits a desired color tone only after the overlap is produced. This may prevent that the color tone is unfavorably darkened by the overlap.

Producing the overlap between the layers may afford an accelerated process of fabricating the three-dimensional object.

In the three-dimensional object fabrication device 40 according to one aspect of the present invention, in addition to the above configuration, the second formation unit (inkjet head device 10 and controller 30) sets the width of the whole region (parts 53 of the colored layer in the layers 5a(7) to 5a(14)) along the inward direction thereof to a width twice (2d) as large as a thickness (d) of the layers 5a(7) to 5a(14) in the layer-stacking direction.

The discharged ink volume of the ink (coloring ink) per unit volume is equal in the whole region and the overlap region (second colored region 53b) formed by the formation unit (inkjet head device 10 and controller 30). Such a whole region, when viewed along the inward direction, may be prevented from degrading in color tone. The discharged ink volume of the ink (coloring ink) per unit volume is reduced to a smaller volume in the whole region than in the non-overlap region. The whole region, however, is formed in a relatively large thickness along the inward direction. This may prevent that the whole region exhibits a weaker color tone.

The three-dimensional object fabrication device 40 according to one aspect of the present invention, in addition to the above configuration, may further have a third formation unit (inkjet head device 10 and controller 30). The third formation unit forms the transparent parts (parts 52 of the first transparent layer) using a transparent ink in at least two of the layers 5a(3), . . . on an inner side of the layers 5a than the colored parts (parts 53 of the colored layer). The third formation unit (inkjet head device 10 and controller 30) makes the transparent parts (parts 52 of the first transparent layer) included in upper and lower ones of the at least two of the layers 5a(3), . . . partly overlap with each other.

The three-dimensional object fabrication device 40 according to one aspect of the present invention, in addition to the above configuration, may further have a fourth formation unit (inkjet head device 10 and controller 30). The fourth formation unit forms the light-reflective parts (parts 51 of the light-reflective layer) using a light-reflective ink in at least two of the layers 5a(3), . . . having the transparent parts (parts 52 of the first transparent layer). The light-reflective parts are formed on an inner side of the layers than the transparent parts (parts 52 of the first transparent layer). The fourth formation unit (inkjet head device 10 and controller 30) makes the light-reflective parts (parts 51 of the light-reflective layer) included in upper and lower ones of the at least two of the layers 5a . . . partly overlap with each other.

The method of fabricating a three-dimensional object according to one aspect of the present invention includes the formation step of forming layers in a stacked configuration using the coloring ink or the transparent ink. The formation step forms the overlap region (second colored region 53b) between the layers made of the same ink (ink used to form the parts 53 of the colored layer) in a manner that the discharged ink volume of the ink per unit volume is reduced to a smaller volume in the overlap region (second colored region 53b) than in any non-overlapping region (first colored region 53a) between the layers but the overlap region (second colored region 53b).

This method forms the parts made of the same ink so as to overlap each other. In an attempt to form the colored layers using, for example, the coloring ink in a manner that the colored parts in the respective layers are continuous in the layer-stacking direction with no overlap therebetween, high-accuracy adjustments are required of positions of the colored parts to be formed in the respective layers (the positions need to be adjusted with great caution). This may be a bottleneck in speedy fabrication of the three-dimensional object. Forming the layers 5a(2), . . . so that their colored parts (parts 53 of the colored layer) overlap each other may allow the three-dimensional object 5 to be speedily fabricated.

By having the parts made of the same ink overlap each other, the partly overlapping colored parts in the respective layers 5*a*(2), . . . (parts 53 of the colored layer), as described in the embodiment, it may be prevented that the colored parts (parts 53 of the colored layer) in the vertically adjacent layers 5*a*(2), . . . are spaced apart and presented as color loss.

Further, the discharged ink volume of the coloring ink per unit volume is reduced to a smaller volume in the overlap region (second colored region 53*b*) than in the non-overlap region (first colored region 53*a*). The color tone of the overlap region (second colored region 53*b*) may be adjusted to exhibit a desired color tone only after the overlap is produced. This aspect may speedily provide the three-dimensional object 5 with a pleasant color tone by preventing such an event that the color tone is unfavorably darkened by the overlap.

The three-dimensional object 5 according to one aspect of the present invention includes layers made of one of the coloring ink and the transparent ink and formed in a stacked configuration. A discharged ink volume of the ink per unit volume is reduced to a smaller volume in an overlap region (second colored region 53*b*) between the layers made of the same ink (ink used to form the parts 53 of the colored layer) than in any non-overlap region (first colored region 53*a*) between the layers made of the same ink but the overlap region (second colored region 53*b*).

According to the above configuration, the three-dimensional object having pleasant color tone with no color tone failure is provided.

The present invention is not necessarily limited to the embodiments described above and may be carried out in many other forms. The technical scope of the present invention encompasses any of such modifications, and embodiments obtained by variously combining the technical means described in the embodiments.

INDUSTRIAL APPLICABILITY

The present invention is applicable to all kinds of three-dimensional object fabrication devices including automatic vending machines capable of automatically fabricating and selling three-dimensional objects.

The invention claimed is:

1. A three-dimensional object fabrication device, comprising:
a formation unit, configured to form layers in a stacked configuration and each layer using a first ink and a second ink, wherein the first ink using a coloring ink, and the second ink using one of a coloring ink and a transparent ink,
the formation unit discharges ink droplets of the first ink and the second ink by an inkjet printing,
wherein the formation unit further configured to arrange the ink droplets and form an overlap region of the layers made of the first ink and the second ink in a manner that a discharged ink volume of the first ink or the second ink per unit volume is reduced to a smaller volume in the overlap region than in any non-overlap region of the layers made of the first ink or the second ink, wherein the non-overlap region is a region other than the overlap region and formed by the first ink or the second ink.

2. The three-dimensional object fabrication device as set forth in claim 1, wherein the overlap region is a region where layers having colored parts made of the first ink and the second ink overlap each other, wherein the second ink using the coloring ink, and
the formation unit forms, as the colored part in a respective one of the layers, the overlap region and an adjacent region adjacent to the overlap region in a direction perpendicular to a layer-stacking direction, and
the formation unit forms the overlap region in a manner that a discharged ink volume of the coloring ink per unit volume is reduced to a smaller volume in the overlap region than in the adjacent region.

3. The three-dimensional object fabrication device as set forth in claim 2, wherein
the formation unit forms the overlap region in a manner that the discharged ink volume in total of the first ink and the second ink per unit volume of the overlap region in upper and lower ones of the layers equals to the discharged ink volume of the first ink and the second ink per unit volume of the adjacent region in one of the layers.

4. The three-dimensional object fabrication device as set forth in claim 1, wherein
the formation unit forms a first overlap region and a second overlap region in a respective one of the layers, and
the formation unit, of two of the layers stacked on each other, makes the first overlap region in a lower one of the layers overlap with the second overlap region in an upper one of the layers or overlap with the first overlap region in the upper one of the layers.

5. The three-dimensional object fabrication device as set forth in claim 2, wherein
the formation unit forms a first overlap region and a second overlap region in a respective one of the layers, and
the formation unit, of two of the layers stacked on each other, makes the first overlap region in a lower one of the layers overlap with the second overlap region in an upper one of the layers or overlap with the first overlap region in the upper one of the layers.

6. The three-dimensional object fabrication device as set forth in claim 5, wherein
the formation unit forms, in a respective one of the layers, the first overlap region and the second overlap region in an equal width along an inward direction of the layer, and
the colored part in one of the layers has a width greater than or equal to 2w, where w is the width of the first and second overlap regions.

7. The three-dimensional object fabrication device as set forth in claim 1, further comprising:
a second formation unit, configured to form the overlap region of the layers made of the first ink and the second ink in a whole region of the layers, wherein
the second formation unit forms the overlap region in a manner that the discharged ink volume of the first ink and the second ink per unit volume in the whole region equals to the discharged ink volume of the first ink and the second ink per unit volume in the overlap region formed by the second formation unit.

8. The three-dimensional object fabrication device as set forth in claim 7, wherein the second formation unit sets a width of the whole region along the inward direction of the layers to a width twice (2d) as large as a thickness (d) of the layers in the layer-stacking direction.

9. The three-dimensional object fabrication device as set forth in claim 2, further comprising:
a third formation unit, configured to form a transparent part using the transparent ink in at least two of the layers on an inner side thereof than the colored parts, wherein
the third formation unit makes the transparent parts included in upper and lower ones of the at least two of the layers partly overlap with each other.

10. The three-dimensional object fabrication device as set forth in claim 9, further comprising:
a fourth formation unit, configured to form a light-reflective part using one of a white ink and a light-reflective ink in at least two of the layers having the transparent parts, the light-reflective parts being formed on an inner side of the layers than the transparent parts, wherein
the fourth formation unit makes the light-reflective parts in upper and lower ones of the at least two of the layers partly overlap each other.

11. A three-dimensional object fabrication method, comprising:
a formation step of forming layers in a stacked configuration and each layer using a first ink and a second ink, wherein the first ink using a coloring ink, and the second ink using one of a coloring ink and a transparent ink,
the formation step is a step of discharging ink droplets of the first ink and the second ink by an inkjet printing,
wherein the formation step further comprising: arranging the ink droplets and forming an overlap region of the layers made of the first ink and the second ink in a manner that a discharged ink volume of the first ink or the second ink per unit volume is reduced to a smaller volume in the overlap region than in any non-overlap region of the layers made of the first ink or the second ink, wherein the non-overlap region is a region other than the overlap region and formed by the first ink or the second ink.

12. A three-dimensional object, comprising:
layers in a stacked configuration and each layer using a first ink and a second ink, wherein the first ink using a coloring ink, and the second ink using one of a coloring ink and a transparent ink,
wherein the first ink and the second ink are discharged as ink droplets by an inkjet printing,
wherein the ink droplets are arranged to make a discharged ink volume of the first ink or the second ink per unit volume is reduced to a smaller volume in an overlap region of the layers made of the first ink and the second ink than in any non-overlap region of the layers made of the first ink or the second ink, wherein the non-overlap region is a region other than the overlap region and formed by the first ink or the second ink.

13. The three-dimensional object fabrication device as set forth in claim 1, wherein
the formation unit is configured to use the transparent ink as a supplementary ink to increase an ink packing density of a region in a colored layer where the coloring ink alone is not enough for the ink packing density to meet a predetermined ink packing density, during forming the colored layer.

14. The three-dimensional object fabrication device as set forth in claim 12, wherein
the formation unit is configured to form a transparent layer on an outer side of a colored layer, wherein the transparent layer is formed by using the transparent ink, and the colored layer is formed by using the coloring ink.

* * * * *